US012081827B2

United States Patent
Black et al.

(10) Patent No.: US 12,081,827 B2
(45) Date of Patent: Sep. 3, 2024

(54) DETERMINING VIDEO PROVENANCE UTILIZING DEEP LEARNING

(71) Applicants: Adobe Inc., San Jose, CA (US); University of Surrey, Guildford (GB)

(72) Inventors: Alexander Black, London (GB); Van Tu Bui, Guildford (GB); John Collomosse, Woking (GB); Simon Jenni, Hägendorf (CH); Viswanathan Swaminathan, Saratoga, CA (US)

(73) Assignees: Adobe Inc., San Jose, CA (US); University of Surrey, Guildford (GB)

( * ) Notice: Subject to any disclaimer, the term of this patent is extended or adjusted under 35 U.S.C. 154(b) by 176 days.

(21) Appl. No.: 17/822,573

(22) Filed: Aug. 26, 2022

(65) Prior Publication Data
US 2024/0073478 A1    Feb. 29, 2024

(51) Int. Cl.
| H04N 21/434 | (2011.01) |
| G06F 16/732 | (2019.01) |
| G06F 16/78 | (2019.01) |
| H04N 21/84 | (2011.01) |
| H04N 21/845 | (2011.01) |

(52) U.S. Cl.
CPC ....... *H04N 21/4341* (2013.01); *G06F 16/732* (2019.01); *G06F 16/7867* (2019.01); *H04N 21/84* (2013.01); *H04N 21/8456* (2013.01)

(58) Field of Classification Search
CPC .............. H04N 21/4341; H04N 21/84; H04N 21/8456; G06F 16/732; G06F 16/7867
See application file for complete search history.

(56) References Cited

U.S. PATENT DOCUMENTS 11,601,442 B2 *   3/2023   Sekar ................. H04L 63/1416

FOREIGN PATENT DOCUMENTS

| CA | 3034323 A1 * | 3/2018 | ......... G06F 16/9535 |
| CN | 112966127 B  * | 5/2022 | ............. G06F 16/43 |
| WO | WO-2022005653 A1 * | 1/2022 | ............. G06N 3/045 |

OTHER PUBLICATIONS

Andrew Rouditchenko et al., "Self-Supervised Audio-Visual Co-Segmentation"; 978-1-5386-4658-8/18, © 2019 IEEE (Year: 2019).*
Sepehr Valipour et al., "Recurrent Fully Convolutional Networks for Video Segmentation": arXiv:1606.00487v3 [cs.CV] Oct. 31, 2016 (Year: 2016).*
A. Ilyas, L. Engstrom, A. Athalye, and J. Lin. Black-box adversarial attacks with limited queries and information. In ICML, 2018.
(Continued)

*Primary Examiner* — Dramos Kalapodas
(74) *Attorney, Agent, or Firm* — Keller Preece PLLC

(57) ABSTRACT

The present disclosure relates to systems, methods, and non-transitory computer readable media that utilize deep learning to map query videos to known videos so as to identify a provenance of the query video or identify editorial manipulations of the query video relative to a known video. For example, the video comparison system includes a deep video comparator model that generates and compares visual and audio descriptors utilizing codewords and an inverse index. The deep video comparator model is robust and ignores discrepancies due to benign transformations that commonly occur during electronic video distribution.

20 Claims, 14 Drawing Sheets

(56) References Cited

OTHER PUBLICATIONS

Aleksander Madry, Aleksandar Makelov, Ludwig Schmidt, Dimitris Tsipras, and Adrian Vladu. Towards deep learning models resistant to adversarial attacks. In ICLR, 2018.

Alex Tamkin, Mike Wu, and Noah Goodman. Viewmaker networks: Learning views for unsupervised representation learning. In ICLR, 2021. URL https://openreview.net/forum?id=enoVQWLsfyL.

Alexey Kurakin, Ian Goodfellow, and Samy Bengio. Adversarial examples in the physical world. arXiv preprint arXiv:1607.02533, 2016.

Anish Athalye and Ilya Sutskever. Synthesizing robust adversarial examples. arXiv preprint arXiv:1707.07397, 2017.

Brian Dolhansky and Cristian Canton Ferrer. Adversarial collision attacks on image hashing functions. CVPR Workshop on Adversarial Machine Learning, 2021.

C. Szegedy, W. Liu, Y. Jia, P. Sermanet, S. Reed, D. Anguelov, D. Erhan, V. Vanhoucke, and A. Rabinovich. Going deeper with convolutions. In Proceedings of the IEEE conference on computer vision and pattern recognition, pp. 1-9, 2015.

Christian Szegedy, Wojciech Zaremba, Ilya Sutskever, Dumitru Erhan Joan Bruna, Ian Goodfellow, and Rob Fergus. Intriguing properties of neural networks. In ICLR, 2013.

D. Tsipras, S. Santurkar, L. Engstrom, A. Turner, and A. Madry. Robustness may be at odds with accuracy. In ICLR, 2019.

Dan Hendrycks, Norman Mu, Ekin D. Cubuk, Barret Zoph, Justin Gilmer, and Balaji Lakshminarayanan. Augmix: A simple data processing method to improve robustness and uncertainty. ICLR, 2020.

Dou Goodman, Hao Xin, Wang Yang, Wu Yuesheng, Xiong Junfeng, and Zhang Huan. Advbox: a toolbox to generate adversarial examples that fool neural networks. arXiv preprint arXiv:2001.05574, 2020.

Eric Wong, Leslie Rice, and J. Zico Kolter. Fast is better than free: Revisiting adversarial training. ICLR, 2020.

Gavin Weiguang Ding, Luyu Wang, and Xiaomeng Jin. AdverTorch v0.1: An adversarial robustness toolbox based on pytorch. arXiv preprint arXiv:1902.07623, 2019.

Giorgos Tolias, Filip Radenovic, and Ondrej Chum. Targeted mismatch adversarial attack: Query with a flower to retrieve the tower. In Proceedings of the IEEE/CVF International Conference on Computer Vision, pp. 5037-5046, 2019.

Hongyang Zhang, Yaodong Yu, Jiantao Jiao, Eric P. Xing, Laurent El Ghaoui, and Michael I. Jordan. Theoretically principled trade-off between robustness and accuracy. In ICML, 2019.

I. Goodfellow, J. Shlens, and C. Szegedy. Explaining and harnessing adversarial examples. arXiv preprint arXiv:1412.6572v3, 2014.

Jonas Rauber, Wieland Brendel, and Matthias Bethge. Foolbox: A python toolbox to benchmark the robustness of machine learning models. In ICML Reliable Machine Learning in the Wild Workshop, 2017.

Kevin Eykholt, Ivan Evtimov, Earlence Fernandes, Bo Li, Dawn Song, Tadayoshi Kohno, Amir Rahmati, Atul Prakash, and Florian Tramer. Note on attacking object detectors with adversarial stickers. arXiv preprint arXiv:1712.08062, 2017.

Logan Engstrom, Andrew Ilyas, Shibani Santurkar, Dimitris Tsipras, Brandon Tran, and Aleksander Madry. Adversarial robustness as a prior for learned representations. arXiv preprint arXiv:1906.00945, 2019.

Maksym Andriushchenko and Nicolas Flammarion. Understanding and improving fast adversarial training. NeurIPS, 2020.

Maksym Andriushchenko, Francesco Croce, Nicolas Flammarion, and Matthias Hein. Square attack: a query-efficient black-box adversarial attack via random search. In ECCV, 2020.

Marco Melis, Ambra Demontis, Maura Pintor, Angelo Sotgiu, and Battista Biggio. secml: A python library for secure and explainable machine learning. arXiv preprint arXiv:1912.10013, 2019.

Maria-Irina Nicolae, Mathieu Sinn, Minh Ngoc Tran, Beat Buesser, Ambrish Rawat, Martin Wistuba, Valentina Zantedeschi, Nathalie Baracaldo, Bryant Chen, Heiko Ludwig, Ian Molloy, and Ben Edwards. Adversarial robustness toolbox v1.2.0. arXiv preprint arXiv:1807.01069, 2018.

Minseon Kim, Jihoon Tack, and Sung Ju Hwang. Adversarial self-supervised contrastive learning. NeurIPS, 2020.

N. Papernot, P. McDaniel, and I. Goodfellow. Transferability in machine learning: from phenomena to black-box attacks using adversarial samples. arXiv preprint arXiv:1605.07277, 2016.

Nicolas Papernot, Fartash Faghri, Nicholas Carlini, Ian Goodfellow, Reuben Feinman, Alexey Kurakin, Cihang Xie, Yash Sharma, Tom Brown, Aurko Roy, Alexander Matyasko, Vahid Behzadan, Karen Hambardzumyan, Zhishuai Zhang, Yi-Lin Juang, Zhi Li, Ryan Sheatsley, Abhibhav Garg, Jonathan Uesato, Willi Gierke, Yinpeng Dong, David Berthelot, Paul Hendricks, Jonas Rauber, and Rujun Long. Technical report on the cleverhans v2.1.0 adversarial examples library. arXiv preprint arXiv:1610.00768, 2018.

Parsa Saadatpanah, Ali Shafahi, and Tom Goldstein. Adversarial attacks on copyright detection systems. In ICML, 2020.

S. Thys, W. Van Ranst, and T. Goedeme. Fooling automated surveillance cameras: adversarial patches to attack person detection. arXiv preprint arXiv:1904.08653, 2019.

S.-M. Moosavi-Dezfooli, A. Fawzi, and P. Frossard. Deepfool: a simple and accurate method to fool deep neural networks. In Proceedings of the IEEE Conference on Computer Vision and Pattern Recognition, pp. 2574-2582, 2016.

Shang-Tse Chen, Cory Cornelius, Jason Martin, and Duen Horng Chau. ShapeShifter: Robust physical adversarial attack on faster r-CNN object detector. In Machine Learning and Knowledge Discovery in Databases, pp. 52-68. Springer International Publishing, 2019. doi: 10.1007/978-3-030-10925-74.

Sven Gowal, Chongli Qin, Jonathan Uesato, Timothy Mann, and Pushmeet Kohli. Uncovering the limits of adversarial training against norm-bounded adversarial examples. arXiv, 2020.

T. Brown, D. Mane, A. Roy, M. Abadi, and J. Gilmer. Adversarial patch. arXivpreprintarXiv:1712.09665, 2017.

Yonglong Tian, Chen Sun, Ben Poole, Dilip Krishnan, Cordelia Schmid, and Phillip Isola. What makes for good views for contrastive learning? NeurIPS, 2020.

A. Bharati, D. Moreira, P.J. Flynn, A. de Rezende Rocha, K.W. Bowyer, and W.J. Scheirer. 2021. Transformation-Aware Embeddings for Image Provenance. IEEE Trans. Info. Forensics and Sec. 16 (2021), 2493-2507.

A. Black, T. Bui, H. Jin, V. Swaminathan, and J. Collomosse. 2021. Deep Image Comparator: Learning to Visualize Editorial Change. In Proceedings of the IEEE/CVF Conference on Computer Vision and Pattern Recognition (CVPR)Workshops. 972-980.

A. Krizhevsky, I. Sutskever, and G. Hinton. Imagenet classification with deep convnets. In Proc. NIPS, 2012.

A.Gordo, J.Almazan, J. Revaud, and D. Larlus. Deep image retrieval: Learning global representations for image search. In Proc. ECCV, pp. 241-257, 2016.

Andreas Geiger, Philip Lenz, Christoph Stiller, and Raquel Urtasun. Vision meets robotics: The kitti dataset. International Journal of Robotics Research (IJRR), 2013.

B. Dolhansky, J. Bitton, B. Pflaum, J. Lu, R. Howes, M. Wang, and C. C. Ferrer. The deepfake detection challenge (DFDC) dataset. CoRR, abs/2006.07397, 2020.

C. Jacobs, A. Finkelstein, and D. Salesin. 1995. Fast multiresolution image querying. In Proc. ACM SIGGRAPH. ACM, 277-286.

C. Zauner. Implementation and benchmarking of perceptual image hash functions. Master's thesis, Upper Austria University of Applied Sciences, Hagenberg, 2010.

Coalition for Content Provenance and Authenticity. 2021. Draft Technical Specification 0.7. Technical Report. C2PA. https://c2pa.org/public-draft/.

D. Brian, H. Russ, P. Ben, B. Nicole, and F. C. Canton. 2019. The deepfake detection challenge (dfdc) preview dataset. arXiv preprint arXiv:1910.08854 (2019).

D. Hendrycks and T. Dietterich. Benchmarking neural network robustness to common corruptions and perturbations. In Proc. ICLR, 2019.

(56) References Cited

OTHER PUBLICATIONS

D. Moreira, A. Bharati, J. Brogan, A. Pinto, M. Parowski, K.W. Bowyer, P.J. Flynn, A. Rocha, and W.J. Scheirer. 2018. Image provenance analysis at scale. IEEE Trans. Image Proc. 27, 12 (2018), 6109-6122.

D. Profrock, M. Schlauweg, and E. Muller. Content-based watermarking by geometric wrapping and feature-based image segmentation. In Proc. SITIS, pp. 572-581, 2006.

Dan Hendrycks, Steven Basart, Norman Mu, Saurav Kadavath, Frank Wang, Evan Dorundo, Rahul Desai, Tyler Zhu, Samyak Parajuli, Mike Guo, et al. The many faces of robustness: A critical analysis of out-of-distribution generalization. arXiv preprint arXiv:2006. 16241, 2020.

E. J. Humphrey and J. P. Bello. 2012. Rethinking automatic chord recognition with convolutional neural networks. In Proc. Intl. Conf. on Machine Learning and Applications.

E. Nguyen, T. Bui, V. Swaminathan, and J. Collomosse. 2021. OSCAR-Net: Objectcentric Scene Graph Attention for Image Attribution. In Proc. ICCV.

F. Khelifi and A. Bouridane. Perceptual video hashing for content identification and authentication. IEEE TCSVT, 1(29), 2019.

F. Rigaud and M. Radenen. 2016. Singing voice melody transcription using deep neural networks. In Proc. Intl. Conf. on Music Information Retreival (ISMIR).

F. Zheng, G. Zhang, and Z. Song. 2001. Deep convolutional neural networks for predominant instrument recognition in polyphonic music. J. Computer Science and Technology 16, 6 (2001), 582-589.

G. Tzanetakis and P. Cook. 2002. Musical genre classification of audio signals. IEEE Trans. on Audio and Speech Proc. (2002).

Github.com—ISCC—Specification v1.0.0—Date downloaded Aug. 19, 2022; https://github.com/iscc/iscc-specs/blob/version-1.0/docs/specification.md.

H. Chen, W. Xie, A. Vedaldi, and A. Zisserman. 2020b. VGG-Sound: A large scale audio-visual dataset. In Proc. Intl. Conf. on Acoustics, Speech and Signal Processing (ICASSP).

H. Lee, P. Pham, Y. Largman, and A. Y. Ng. 2009. Unsupervised feature learning for audio classification using convolutional deep belief networks. In Proc. Advances in Neural Information Processing Systems (NIPS).

H. Liu, R. Wang, S. Shan, and X. Chen. Deep supervised hashing for fast image retrieval. In Proc. CVPR, pp. 2064-2072, 2017.

H. Shawn, C. Sourish, E. Daniel PW, G. Jort F, J. Aren, M. R. Channing, P. Manoj, P. Devin, S. Rif A, S. Bryan, et al. 2017. CNN architectures for large-scale audio classification. In Proc. Intl. Conf. on Acoustics, Speech and Signal Processing (ICASSP). IEEE, 131-135.

H. Zhu, M. Long, J. Wang, and Y. Cao. Deep hashing network for efficient similarity retrieval. In Proc. AAAI, 2016.

IPTC Council. Social media sites photo metadata test results. http://embeddedmetadata.org/social-media-test-results.php, 2020.

J. Aythora et al. Multi-stakeholder media provenance management to counter synthetic media risks in news publishing. In Proc. Intl. Broadcasting Convention (IBC), 2020.

J. Buchner. Imagehash. https://pypi.org/ project/ImageHash/, 2021.

J. Collomosse, T. Bui, A. Brown, J. Sheridan, A. Green, M. Bell, J. Fawcett, J. Higgins, and O. Thereaux. ARCHANGEL: Trusted archives of digital public docu-ments. In Proc. ACM Doc.Eng, 2018.

J. Deng, W. Dong, R. Socher, L.-J. Li, K. Li, and L. Fei-Fei. ImageNet: A Large-Scale Hierarchical Image Database. In Proc. CVPR, 2009.

J. Johnson, M. Douze, and H. Jegou. Billion-scale similarity search with gpus. IEEE Transactions on Big Data, 2017.

J. Lee, J. Park, K. L. Kim, and J. Nam. 2017. Sample-level deep convolutional neural networks for music auto-tagging using raw waveforms. arXiv preprint arXiv:1703.01789 (2017).

J. S. Downie. 2003. Music Information Retrieval. Annual review of information science and technology 37, 1 (2003), 295-340.

J. Schluter and S. Bock. 2013. Musical onset detection with convolutional neural networks. In Proc. Intl. Workshop on Machine Learning and Music (MML).

J. Wang, H. T. Shen, J. Song, and J.Ji. Hashing for similarity search: A survey. arXiv preprint arXiv:1408.2927, 2014.

K. Choi, G. Fazekas, K. Cho, and M. Sandler. 2018. A Tutorial on Deep Learning for Music Information Retrieval. arXiv:1709. 04396v2 (2018).

K. Choi, G. Fazekas, M. Sandler, and K. Cho. 2017. Convolutional recurrent neural networks for music classification. In Proc. Intl. Conf. on Acoustics, Speech and Signal Processing (ICASSP).

K. Hameed, A. Mumtax, and S. Gilani. 2006. Digital imageWatermarking in the wavelet transform domain. WASET 13 (2006), 86-89.

K. He, X. Zhang, S. Ren, and J. Sun. Deep residual learning for image recognition. In Proc. CVPR, pp. 770-778, 2015.

Karen Sparck Jones. 1972. A statistical interpretation of term specificity and its application in retrieval. Journal of documentation (1972).

L. Rosenthol, A. Parsons, E. Scouten, J. Aythora, B. MacCormack, P. England, M. Levallee, J. Dotan, et al. 2020. Content Authenticity Initiative (CAI): Setting the Standard for Content Attribution. Technical Report. Adobe Inc.

L. Yuan, T. Wang, X. Zhang, F. Tay, Z. Jie, W. Liu, and J. Feng. Central similarity quantization for efficient image and video retrieval. In Proc. CVPR, pp. 3083-3092, 2020.

L.-C. Yang, S.-Y. Chou, J.-Y. Liu, Y.-H. Yang, and Y.-A. Chen. 2017. Revisiting the problem of audio-based hit song prediction using convolutional neural networks. arXiv preprint arXiv:1704.01280 (2017).

M. Douze, G. Tolias, E. Pizzi, Z. Papakipos, L. Chanussot, F. Radenovic, T. Jenicek, M. Maximov, L. Leal-Taixe, I. Elezi, O. Chum, and C. C. Ferrer. 2021. The 2021 Image Similarity Dataset and Challenge. CoRR abs/2106.09672 (2021). arXiv:2106.09672 http://arxiv.org/abs/2106.09672.

M. Huh, A. Liu, A. Owens, and A. Efros. Fighting fake news: Image splice detection via learned self-consistency. In Proc. ECCV, 2018.

N. Yu, L. Davis, and M. Fritz. Attributing fake images to gans: Learning and analyzing gan fingerprints. In IEEE International Conference on Computer Vision (ICCV), 2019.

N. Yu, V. Skripniuk, S.r Abdelnabi, and M. Fritz. 2021. Artificial Fingerprinting for Generative Models: Rooting Deepfake Attribution in Training Data. In Proc. Intl. Conf. Computer Vision (ICCV).

P. Devi, M. Venkatesan, and K. Duraiswamy. A fragile watermarking scheme for image authentication with tamper localization using integer wavelet transform. J. Computer Science, 5(11):831-837, 2009.

P. Torr and A. Zisserman. Mlesac: A new robust estimator with application to estimating image geometry. Computer Vision Image Understanding (CVIU), 78(1):138-156, 2000.

Q-Y. Jiang and W-J. Li. 2018. Asymmetric Deep Supervised Hashing. In AAAI.

Q. Li, Z. Sun, R. He, and T. Tan. Deep supervised discrete hashing. In Proc. NeurIPS, pp. 2482-2491, 2017.

R. Hadsell, S. Chopra, and Y. LeCun.Dimensionality reduction by learning an invariant mapping. In Proc. CVPR, pp. 1735-1742, 2006.

R. Lu, K. Wu, Z. Duan, and C. Zhang. 2017. Deep ranking: triplet matchnet for music metric learning. In Proc. Intl. Conf. on Acoustics, Speech and Signal Processing (ICASSP).

S-Y. Wang, O. Wang, A. Owens, R. Zhang, and A. Efros. Detecting photoshopped faces by scripting photoshop. In Proc. ICCV, 2019.

S-Y. Wang, O. Wang, R. Zhang, A. Owens, and A. Efros. Cnn-generated images are surprisingly easy to spot . . . for now. In Proc. CVPR, 2020.

S. Baba, L. Krekor, T. Arif, and Z. Shaaban. Watermarking scheme for copyright protection of digital images. IJCSNS, 9(4), 2009.

S. Dieleman and B. Schrauwen. 2014. End-to-end learning for music audio. In Proc. Intl. Conf. on Acoustics, Speech and Signal Processing (ICASSP).

S. Gregory. 2019. Ticks or it didn't happen. Technical Report. Witness.org.

(56) References Cited

OTHER PUBLICATIONS

S. Heller, L. Rossetto, and H. Schuldt. The PS-Battles Dataset—an Image Collection for Image Manipulation Detection. CoRR, abs/1804.04866, 2018.

S. Jenni and P. Favaro. Self-supervised feature learning by learning to spot artifacts. In Proc. CVPR, 2018.

S. Sigtia, E. Benetos, and S. Dixon. 2015. An end-to-end neural network for polyphonic music transcription. arXiv preprint arXiv:1508.01774 (2015).

S. Su, C. Zhang, K. Han, and Y. Tian. 2018. Greedy hash: Towards fast optimization for accurate hash coding in CNN. In Proc. NeurIPS. 798-807.

T. Bertin-Mahieux, D. P. Ellis, B. Whitman, and P. Lamere. 2011. The million song dataset. In Proc. Intl. Conf of Soceity for Music Information Retrieval. 591-596.

T. Bui, D. Cooper, J. Collomosse, M. Bell, A. Green, J. Sheridan, J. Higgins, A. Das, J. Keller, and O. Thereaux. 2020. Tamper-proofing Video with Hierarchical Attention Autoencoder Hashing on Blockchain. IEEE Trans. Multimedia (TMM) 22, 11 (2020), 2858-2872. https://doi.org/10.1109/TMM.2020.2967640.

T. Chen, S. Kornblith, M. Norouzi, and G. Hinton. A simple framework for contrastive learning of visual representations. In Proc. ICML, pp. 1597-1607, 2020.

T. Grill and J. Schluter. 2015. Music boundary detection using neural networks on spectrograms and self-similarity lag matrices. In Proc. EUSPICO.

T. Pan. 2019. Digital-Content-Based Identification: Similarity hashing for content identification in decentralized environments. In Proc. Blockchain for Science.

Vladimir I Levenshtein et al. 1966. Binary codes capable of correcting deletions, insertions, and reversals. In Soviet physics doklady, vol. 10. Soviet Union, 707-710.

W. Li, S. Wang, and W-C. Kang. 2016. Feature learning based deep supervised hashing with pairwise labels. In Proc. IJCAI. 1711-1717.

W. Wang, J. Dong, and T. Tan. Tampered region localization of digital color images based on jpeg compression noise. In International Workshop on Digital Watermarking, pp. 120-133. Springer, 2010.

X. Zhang, Z. H. Sun, S. Karaman, and S.F. Chang. 2020. Discovering Image Manipulation History by Pairwise Relation and Forensics Tools. IEEE J. Selected Topics in Signal Processing. 14, 5 (2020), 1012-1023.

Y. Han, J. Kim, and K. Lee. 2017. Deep convolutional neural networks for predominant instrument recognition in polyphonic music. IEEE Trans. Audio, Speech and Language Processing 25, 1 (2017), 208-221.

Y. Li, M-C. Ching, and S. Lyu. In ictu oculi: Exposing ai created fake videos by detecting eye blinking. In Proc. IEEE WIFS, 2018.

Y. Li, W. Pei, and J. van Gemert. 2019. Push for Quantization: Deep Fisher Hashing. BMVC (2019).

Y. Wu, W. AbdAlmageed, and p. Natarajan. Mantra-net: Manipulation tracing network for detection and localization of image forgeries with anomalous features. In Proc. CVPR, pp. 9543-9552, 2019.

Z. Cao, M. Long, J. Wang, and P. S. Yu. Hashnet: Deep learning to hash by continuation. In Proc. CVPR, pp. 5608-5617, 2017.

Z. Lenyk and J. Park. Microsoft vision model resnet-50 combines web-scale data and multi-task learning to achieve state of the art. https://pypi.org/project/ microsoftvision/, 2021.

Z. Teed and J. Deng. Raft: Recurrent all-pairs field transforms for optical flow. In Proc. ECCV, pp. 402-419. Springer, 2020.

\* cited by examiner

1000

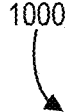

Generating Visual Descriptors For Visual Segments Of A Query Video Utilizing A Visual Neural Network Encoder *1010*

Generating Audio Descriptors For Audio Segments Of The Query Video Utilizing An Audio Neural Network Encoder *1020*

Determining Video Segments From A Plurality Of Known Videos That Are Similar To The Query Video Based On The Visual Descriptors And Audio Descriptors Utilizing An Inverse Index; And *1030*

Identifying A Known Video Of The Plurality Of Known Videos That Corresponds To The Query Video From The Determined Video Segments *1040*

*Fig. 10*

DETERMINING VIDEO PROVENANCE UTILIZING DEEP LEARNING

BACKGROUND

Recent years have seen significant advancements in computer-implemented models for modifying digital videos. Due to the prevalence, ease of use, and capability of video editing software, it is common for users to edit videos. Videos, particularly videos posted online, are often modified to change a story that the video tells and potentially spread misinformation. Unfortunately, it can be difficult or impossible for a person to determine whether a video has been modified. Thus, there exists a need for tools to aid users in determining whether a digital video is an original or has been editorially modified.

SUMMARY

This disclosure describes one or more embodiments of systems, methods, and non-transitory computer readable media that solve one or more problems in the art with a video comparison system that utilizes a deep video retrieval model. The deep video retrieval model accurately and efficiently retrieves matching digital videos (or portions thereof) and determines video provenance information. In particular, the deep video retrieval model generates an inverse index for known videos. For example, for each known video, the deep video retrieval model generates visual descriptors for temporal chucks of video utilizing a visual encoder and generates audio descriptors for the temporal chucks utilizing an audio encoder. The deep video retrieval model then generates the inverse index utilizing the audio and visual descriptors from the various known videos. Given a query video, the deep video retrieval model generates visual and audio descriptors for temporal chunks of the query video. The deep video retrieval model then matches the video and audio descriptors for temporal chunks of the query video against the inverse index to identify a known video match. The deep video retrieval model is robust and ignores discrepancies due to benign video transformations that commonly occur during electronic video distribution, particularly via the Internet.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 10 illustrates a flowchart of a series of acts for identifying a known video corresponding to a query video utilizing a deep video comparator model in accordance with one or more embodiments;

DETAILED DESCRIPTION

Figure 1:
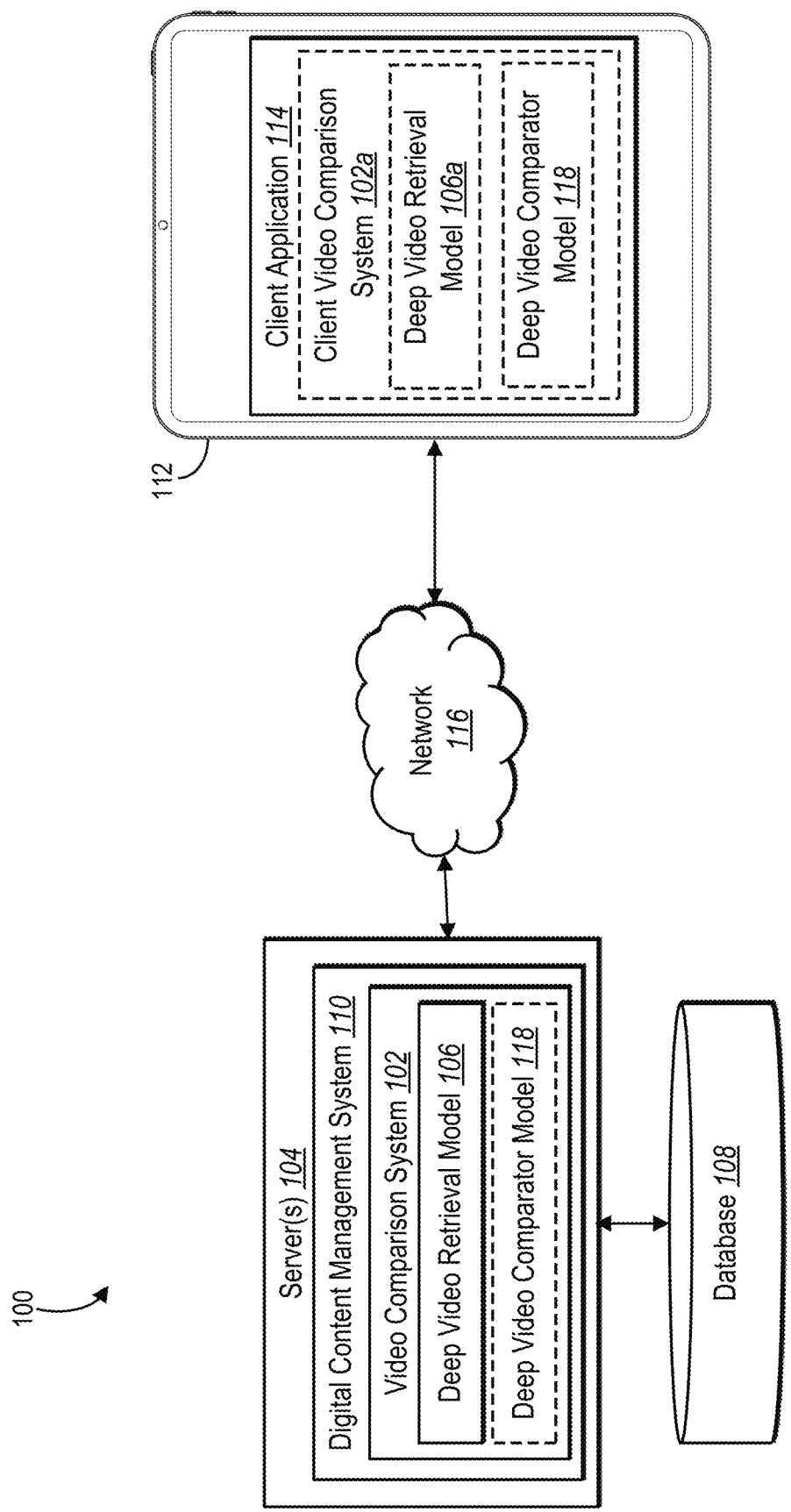
FIG. 1 illustrates an example system environment in which a video comparison system operates in accordance with one or more embodiments.

This disclosure describes one or more embodiments of a video comparison system that utilizes deep learning to map query videos to known videos and determine provenance information for the query video. In particular, the video comparison system sub-divides a query video into visual segments and audio segments. The video comparison system utilizes a visual neural network encoder to generate visual descriptors for the visual segments. Similarly, the video comparison system utilizes an audio neural network encoder to generate audio descriptors for the audio segments. In particular, the video comparison system maps the visual and audio descriptors to codebooks. The video comparison system utilizes an inverse index that maps the codebooks to video segments of known videos. Utilizing the inverse index, the video comparison system determining video segments from a plurality of known videos that are similar to the query video utilizing the inverse index. The video comparison system then identifies a known video of the plurality of known videos that corresponds to the query video from the determined video segments. The video comparison system thus reliably matches a query video (or a partial video) back to a corresponding known video to recover provenance information. Indeed, the video comparison system is able to match fragments of videos (e.g., partial or truncated videos) to determine not only the provenance information of the corresponding known or source video but also the location (e.g., time offset) of the fragment relative to the source or known video.

As mentioned, the video comparison system utilizes deep descriptors to map a query video to a known video. The video comparison system utilizes neural network encoders to generate the visual and audio descriptors in a robust manner so as to be able to matches videos despite transformations to one or more of the audio or visual frames of the video. In particular, the video comparison system generates deep descriptors robust to common transformations such as visual modifications due to quality reduction (noise, blur, pixelization, etc.) during reformatting, change in aspect ratio/geometry (padding, resize, rotation, flipping, etc.), visual enhancement (brightness, color adjustment, etc.) or editorial changes (text/emoji overlay, photoshop, etc.). Similarly, the video comparison system generates deep descriptors robust to audio modifications such as compression, background noise, trimming, effect enhancement, etc.

Thus, in one or more implementations, the video comparison system matches videos to originals videos or known videos contained within a known database. In particular, in one or more implementations, the video comparison system performs a robust near-duplicate video search to identify a matching digital video. For example, the video comparison system find matches in a known database for a query digital video for which a user desires to determine an authenticity. The video comparison system utilizes a robust deep learning to identify near duplicate video despite the presence of manipulations (editorial or benign). In other words, the video comparison system is robust to quality, codecs, and form factors and other manipulations that are commonly made to video as they are shared online. In particular, the video comparison system is robust to these benign manipulations or transformations in both the audio and visual space.

Furthermore, in one or more implementations, the video comparison system identifies regions of a video that have been editorially modified. For example, the video comparison system includes a deep video comparator model that compares a pair of videos and localizes regions that have been editorially manipulated relative to an original or known video. More specifically, the deep video comparator model generates and surfaces visual indications of the location of such editorial changes on the modified video. The deep video comparator model is robust and ignores discrepancies due to benign video transformations that commonly occur during electronic video distribution, particularly via the Internet. Thus, in one or more implementations, the video comparison system allows users to trace a video on the Internet back to a known source and identify what—if any—manipulations have been made to the video. This allows the user to make more informed decisions on whether to trust a story told by the video.

As mentioned above, conventional systems have a number of technical shortcomings with regard to accuracy, security, flexibility, and efficiency. For example, although conventional systems can encode and retrieve digital videos, conventional systems are often fooled that these encoded features will match inaccurate digital videos (or fail to match any digital videos). Recent research has illustrated that adversarial models can generate adversarial videos that fool conventional video retrieval and hashing models. For example, adversarial models can exactly match the perceptual hashes of unrelated videos by using small $\ell_2$ or $\ell_\infty$ adversarial perturbations. Indeed, this problem is "symmetric" in that attackers can generate digital videos that will fool models and/or poison a database of videos (e.g., that would lead to incorrect matching of benign videos as matching known originals). Thus, these adversarial models undermine the security and accuracy of conventional systems that match digital videos and provide provenance data.

Some conventional systems seek to avoid these adversarial attacks through a security-by-obscurity approach. In particular, if the attacker does not know the model and cannot repeatedly query the model, then it is more difficult to generate adversarial videos. Although this approach is easy to implement, it undermines flexibility and is not fully reliable. Indeed, models for video fingerprinting are increasingly deployed to client devices. Such deployment means that attackers can reverse engineer these models and gain white-box access for generating adversarial attacks. Accordingly, conventional approaches rigidly limit deployment options or undermine reliability of conventional systems that seek to avoid adversarial attacks.

Furthermore, many conventional systems are already computationally expensive to train and implement. For example, training large-scale models on millions of digital videos already requires significant computer resources (in processing power and memory). Conventional systems have not identified an approach to address these adversarial attacks, in part, because any solution would make the computational burden of implementing models prohibitively expensive.

Robustly matching and comparing videos is challenging, as video content may be also modified for non-editorial reasons during redistribution. Videos are commonly subject to benign transformations such as changes in size, shape, quality or format by the platforms upon which they are shared. Videos may also be 'manipulated' for editorial reasons, including to alter or falsify their stories. As such conventional cryptographic (bit-level) hashing often fails when attempting to match such videos. Similarly, conventional simple pixel difference operations used to visualize changes will include benign changes making it difficult to identify editorial changes. For example, a sum of squared difference operation is particularly ineffective when a video video has undergone warping or cropping.

As suggested above, embodiments of the video comparison system can provide a variety of advantages over conventional video matching systems. For example, embodiments of the video comparison system can improve accuracy and security by utilizing deep models that are robust to both video and audio transformations that are commonly made to videos. In particular, the video comparison system learns visual and audio descriptors/embeddings that exhibits improved robustness to modifications of videos. The video comparison system applies contrastive training to train a deep video comparator model using a dataset of known videos modified and combined with data augmentations simulating common video modifications. This yields visual and audio descriptors/embeddings for robustly matching a near duplicate query video circulating 'in the wild' to a known database of original videos that is robust to modifications.

Indeed, the video comparison system allows for provenance information to be determined even in instances of misattribution (where videos are stripped of their metadata) or potentially signed with a new manifest in order to misappropriate the video and tell a new story. In particular, by matching videos based on robust visual and audio descriptors, the video comparison system is able to match query videos to corresponding known videos without using metadata. This ability enables the video comparison system to overcome distribution of videos via social media channels and other platforms for content sharing that routinely strip metadata. Thus, the video comparison system is able determine provenance information of videos posted or shared on these common channels upon which fake news is often propagated.

Additionally, by utilizing an inverse index, the video comparison system is able to search for matching videos across a known database of thousands or millions of videos both quickly and without requiring large amounts of processing power. In particular, by utilizing an inverse index of a codebook of codewords, the video comparison system need not perform an exhaustive search comparing an embedding of a query video against an embedding of each video in the video database. Rather, the video comparison system performs a non-exhaustive search by mapping query video segments to codewords, identifying which known videos include the codewords, and ranking the returned known videos. Thus, the video comparison system is able to identify a match for a query video potentially in a time magnitudes smaller than systems that attempt to match a video fingerprint to video fingerprints of known videos. Furthermore, once the inverse index is built, the relatively small size allows for deployment on devices with limited storage or computing power. Thus, video comparison system improves flexibility and reliability. Specifically, the video comparison system is able to run server-side or client-side. Moreover, the video comparison system can achieve the foregoing improvements without undermining efficiency of implementing systems.

Optionally, the video comparison system utilizes a deep video comparator model for comparing digital videos to identify changes that ignores non-editorial changes. The deep video comparator model incorporates both a de-warping and video correlation module. The deep video comparator model is trained end-to-end to ignore out-of-place transformation of content e.g., due to padding or warping as well as in-place corruption due to noise. Given a query, and an original video (retrieved from a known database via a near-duplicate video search) the network produces a heatmap that localizes visual discrepancies due to editorial manipulation. Further, the network predicts a probability that the query video has undergone benign manipulation, editorial manipulation, or whether the input pair are completely different. The deep video comparator model is able to discriminate between changes due to benign transformation and editorial manipulation. Furthermore, the deep video comparator model is able to reject false positive results returned via the near-duplicate video search. In particular, the deep video comparator model improves accuracy of video retrieval by providing a probability that the videos being searched are the same up to and including any benign transformations. Furthermore, the video comparison system can utilize these probabilities to re-rank results to improve video retrieval results.

In one or more embodiments, the video comparison system complements emerging technical standards that embed cryptographically secured provenance information with the metadata of the asset. For example, the emerging specification from cross-industry body the 'Coalition for Content Provenance and Authenticity' (C2PA) writes provenance information into a 'manifest' transported within the asset metadata. Such approaches are vulnerable to removal of metadata, which is common on social media platforms through which misinformation is often spread. For example, video uploaded to any major social media platform today would be stripped of such manifests. Furthermore, alternative manifests may be substituted describing a fake provenance trail or 'back story', so attributing a video out of context to tell a different story. Content misattribution may also deprive creators of credit for their work, enabling intellectual property theft. The video comparison system is able to robustly match video assets circulating without provenance metadata, to an authoritative copy of that asset with such metadata (such as a C2PA manifest), held within a trusted database. Thus, the video comparison system provides techniques to trace the origins of videos and optionally determine changes made thereto. Thus, the video comparison system allows users to make a more informed decision on whether to place trust in the authenticity or story of the video.

Additional detail regarding the video comparison system will now be provided with reference to the figures. For example, FIG. 1 illustrates a schematic diagram of an example system environment (or "environment") 100 for implementing a video comparison system 102 in accordance with one or more embodiments. An overview of the video comparison system 102 is described in relation to FIG. 1. Thereafter, a more detailed description of the components and processes of the video comparison system 102 is provided in relation to the subsequent figures.

As shown, the environment 100 includes server(s) 104, a database 108, a client device 112, and a network 116. Each of the components of the environment communicate via the network 116, and the network 116 is any suitable network over which computing devices communicate. Example networks are discussed in more detail below in relation to FIG. 11.

As mentioned, the environment 100 includes a client device 112. The client device 112 is one of a variety of computing devices, including a smartphone, a tablet, a smart television, a desktop computer, a laptop computer, a virtual reality device, an augmented reality device, or another computing device as described in relation to FIG. 11. Although FIG. 1 illustrates a single instance of the client device 112, in some embodiments, the environment 100 includes multiple different client devices, each associated with a different user. The client device 112 communicates with the server(s) 104 via the network 116. For example, the client device 112 provides information to server(s) 104 indicating client device interactions (e.g., digital video selections, user interactions with one or more pixels of a digital video, or other input) and receives information from the server(s) 104 such as provenance information, a manipulation prediction, localization of editorial changes, and/or digital videos. Thus, in some cases, the video comparison system 102 implemented via the server(s) 104 provides and receives information based on client device interaction via the client device 112.

As shown in FIG. 1, the client device 112 includes a client application 114. In particular, the client application 114 is a web application, a native application installed on the client device 112 (e.g., a mobile application, a desktop application, etc.), or a cloud-based application where all or part of the functionality is performed by the server(s) 104. Based on instructions from the client application 114, the client device 112 presents or displays information to a user, including digital videos, provenance information, and/or manipulation information.

As illustrated in FIG. 1, the environment 100 includes the server(s) 104. The server(s) 104 generates, tracks, stores, processes, receives, and transmits electronic data, such as digital videos, visual search embeddings, provenance information, or indications of editorial changes. For example, the server(s) 104 receives data from the client device 112 in the form of an indication of a client device interaction with a digital video. In response, the server(s) 104 transmits data to the client device 112 to cause the client device 112 to display or editorial changes for the digital video. The server(s) 104 can also monitor creation of digital videos at the client device 112, receive digital videos from the client device 112, and generate/store provenance information or editorial changes corresponding to the digital videos.

In some embodiments, the server(s) 104 communicates with the client device 112 to transmit and/or receive data via the network 116. In some embodiments, the server(s) 104 comprises a distributed server where the server(s) 104 includes a number of server devices distributed across the network 116 and located in different physical locations. The server(s) 104 can comprise a content server, an application server, a communication server, a web-hosting server, a multidimensional server, or a machine learning server. The server(s) 104 can further access and utilize the database 108 to store and retrieve information such as digital videos, digital video fingerprints, provenance information, editorial changes, augmented digital videos, deep video retrieval models, deep video comparator models, and/or manipulation information.

As further shown in FIG. 1, the server(s) 104 also includes the video comparison system 102 as part of a digital content management system 110. For example, in one or more implementations, the digital content management system 110 can store, generate, modify, edit, enhance, provide, distribute, and/or share digital content, such as digital videos. For example, the digital content management system 110 provides tools for the client device 112, via the client application 114, to display or manipulate pixels or audio of digital videos. In some implementations, the digital content management system 110 provides tools for refining digital videos or displaying provenance information regarding digital videos.

In one or more embodiments, the server(s) 104 includes all, or a portion of, the video comparison system 102. For example, the video comparison system 102 operates on the server(s) 104 to identify matching digital videos, determine editorial changes, and provide localization of editorial changes to the client device 112. As illustrated, the video comparison system 102 can also include a deep video retrieval model 106.

In certain cases, the client device 112 includes all or part of the video comparison system 102. Indeed, as illustrated, the client device 112 can include a client video comparison system 102a with a deep video retrieval model 106a with the same or similar functionality to the video comparison system 102. For example, the client device 112 can generate, obtain (e.g., download), or utilize one or more aspects of the video comparison system 102, such as the deep video retrieval model 106a from the server(s) 104. Indeed, in some implementations, as illustrated in FIG. 1, the video comparison system 102 is located in whole or in part of the client device 112. For example, the client video comparison system 102a includes a web hosting application that allows the client device 112 to interact with the server(s) 104. To illustrate, in one or more implementations, the client device 112 accesses a web page supported and/or hosted by the server(s) 104.

For example, in some embodiments, the video comparison system 102 trains the deep video retrieval model 106 and the deep video comparator model 118 via the server(s) 104. The server(s) 104 can provide the deep video retrieval model 106 and the deep video comparator model 118 to the client device 112 for identifying matching videos or provenance information and localizing changes. In other embodiments, the server(s) 104 both train and implement the deep video retrieval model 106 and the deep video comparator model 118. For example, the server(s) 104 can receive a digital video from the client device 112, generate a visual and audio descriptors for segments of the digital video, utilize the visual and audio descriptors and an inverse index to identify a matching digital video, and optionally determine and surface editorial changes relative to the matching digital video to the client device 112.

Although FIG. 1 illustrates a particular arrangement of the environment, in some embodiments, the environment has a different arrangement of components and/or may have a different number or set of components altogether. For instance, as mentioned, the video comparison system 102 is implemented by (e.g., located entirely or in part on) the client device 112. In addition, in one or more embodiments, the client device 112 communicates directly with the video comparison system 102, bypassing the network 116.

Figure 2:
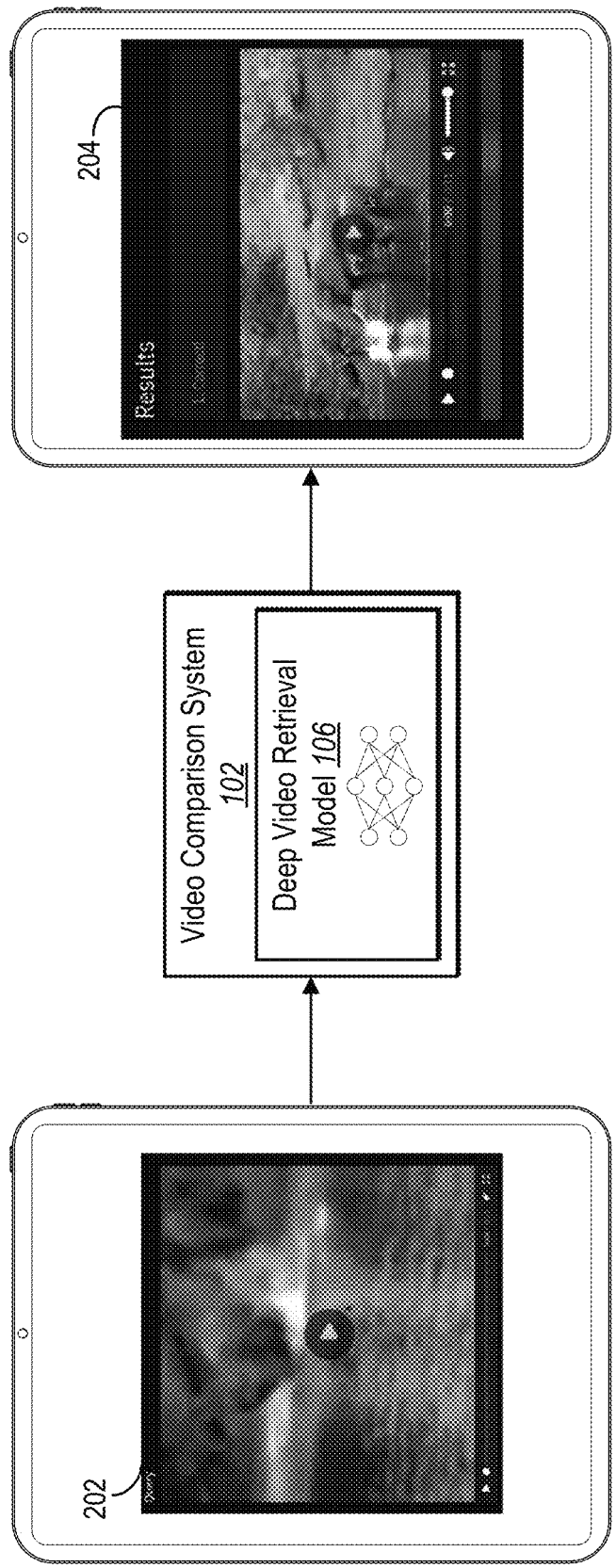
FIG. 2 illustrates an overview of identifying a known video corresponding to a query video utilizing a deep video retrieval model in accordance with one or more embodiments.

As mentioned, in one or more embodiments, the video comparison system 102 utilizes a deep video retrieval model to identify a matching known video to a query digital video. FIG. 2 illustrates an overview of identifying a known digital video corresponding to query digital video utilizing a deep video retrieval model 106 in accordance with one or more embodiments.

For example, FIG. 2 illustrates the video comparison system 102 receives or identifies a known or original digital video 204. The video comparison system 102 receives or identifies a query digital video 202 that has been manipulated relative to the known or original digital video 204. In other words, the query digital video 202 has been modified from its original source video 204. Specifically, the query digital video 202 includes a modifications of warping and blurring due to online distribution. Additionally, or alternatively, the query digital video 202 has a modified manifest or has had metadata stripped therefrom making identification of the source of the query digital video 202 unavailable or false.

The known or original digital video refers to a digital video with known provenance information (e.g., known source data). For example, a known digital video includes digital videos stored in a database with a reference or link to a provenance information. In some embodiments, a known digital video includes provenance data (e.g., stored in metadata of the digital video). In some cases, a known digital video is an original digital video or one that has not been modified from its creation.

Provenance information (e.g., source data) includes a variety of digital information identifying the source, origin, creation, or history of a digital video. For example, provenance information can indicate an author, creator, owner, copyright holder, publisher, or creation location of a digital video. Provenance information also optionally includes revision information (e.g., versions, revisions, and/or revision dates). Thus, provenance information includes a variety of information for providing correct attribution for a digital video.

The video comparison system 102 utilizes the deep video retrieval model 106 to identify a known video 204 corresponding to the query video 202. For example, the deep video retrieval model 106 utilizes an inverse index and codewords based on audio and video descriptors to identify the known video 204. Optionally, as shown, the video comparison system 102 provides a heatmap bar localizing the query video 202 within the known video 204 as described in greater detail below. Furthermore, the deep video retrieval model 106 identifies the known video 204 despite modifications/transformations (e.g., warping and blurring) of the query video 202.

Additionally, the video comparison system 102 optionally provides a notification to an author, owner, copyright holder indicating that the query video 204 has been utilized and/or modified. For example, the video comparison system 102 identifies an owner of a digital video via the database 108. The video comparison system 102 generates and provides an email, text message, pop-up notification, or other digital communication to the owner of the digital video 204 indicating a website or application is utilizing a modified version of the digital video 204. Similarly, the notification optionally includes an indication of a modification prediction, an owner of the website or application utilizing the digital video 204, and/or a selectable option to report an unauthorized use of the digital video 204.

Thus, the video comparison system 102 provides a method for robustly matching video assets circulating without provenance metadata, to an authoritative copy of that asset with such metadata (such as a C2PA manifest), held within a trusted database. Videos often undergo various trans-formations during online distribution; changes in format, resolution, size, padding, effect enhancement etc. that render cryptographic hashes operating on the binary stream, such as SHA-256, unsuitable as means for matching the video content. As such, the video comparison system 102 utilizes matching that is robust to these transformations by considering features extracted from the content of the video clip. Furthermore, the video comparison system 102 is able to match fragments of video (i.e., partial or truncated videos) to determine not only the complete source video but also the time offset at which that fragment exist.

Indeed, as explained in greater detail below, the video comparison system 102 utilizes a deep video retrieval model 106 for matching partial video queries robust to such trans-formations. The deep video retrieval model 106 utilizes an inverse index of robust audio-visual features trained using contrastive learning and a rich set of augmentations representative of transformations typically applied to video 'in the wild' during online content distribution.

Figure 3A:
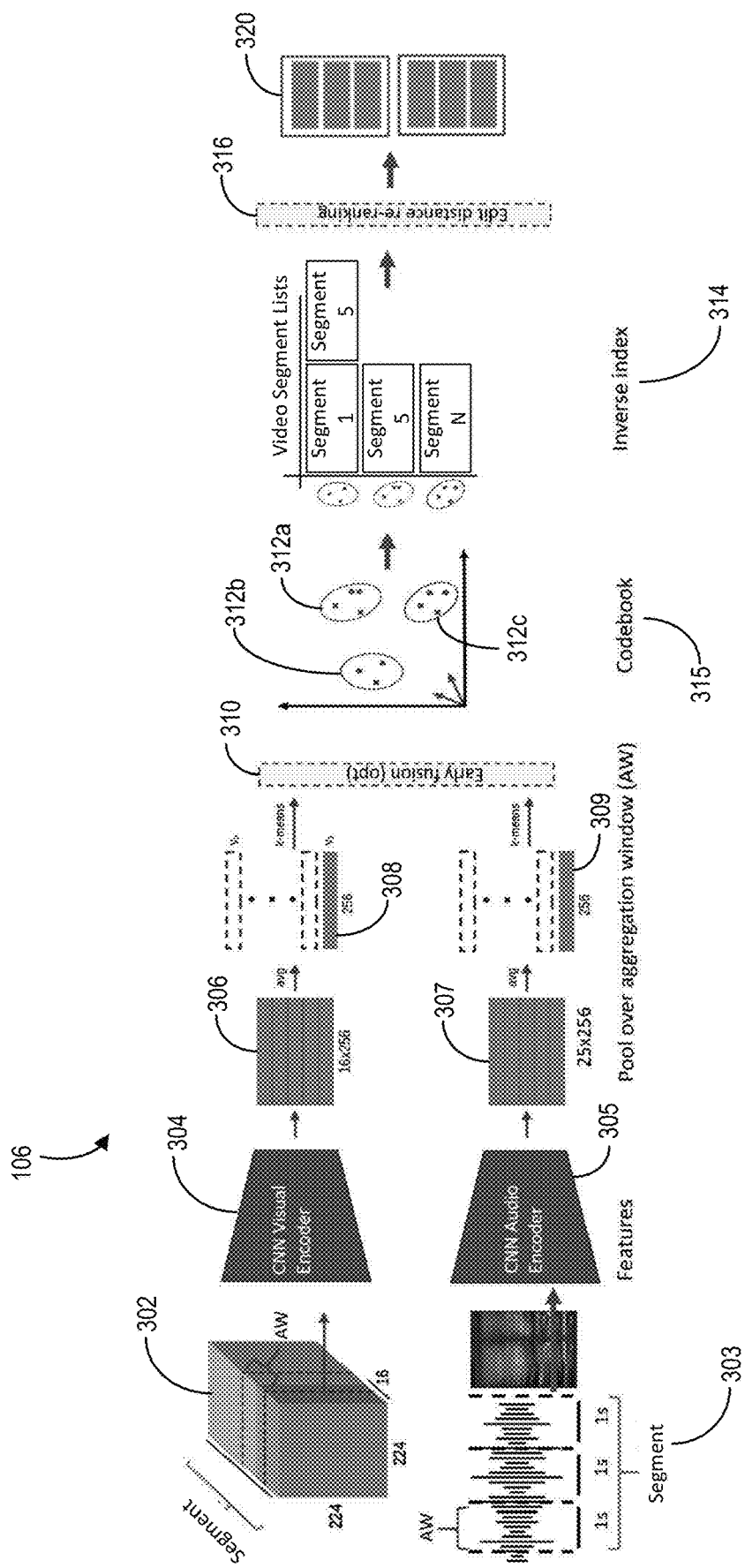
FIG. 3A illustrates an example architecture of a deep video retrieval model of the video comparison system in accordance with one or more embodiments.

Turning now to FIG. 3A details of an example pipeline and architecture of the deep video retrieval model 106 is shown. As mentioned above, the deep video retrieval model 106 sub-divides a video into visual segments 302 and audio segments 303. In particular, as described in more detail below, the deep video retrieval model 106 is a self-supervised network capable of encoding both visual and audio streams in a video. The deep video retrieval model 106 leverages contrastive learning and a rich set of data augmentations for videos for parameter learning. To enable partial video matching, the deep video retrieval model 106 utilizes a 'divide and conquer' approach where video is split into visual segments 302 and audio segments 303 and each segment is indexed and searchable within an inverse index 314.

In particular, to index a variable length video X, the deep video retrieval model 106 splits X into fixed-length segments $X=\{x_i | i=1, 2, \ldots, N\}$ s.t. $\text{len}(x_i)=\text{len}(x_j)=l \forall i, j \in [1, N]$ where $\text{len}(.)$ is the length function (in seconds), constant $l$ is the segment length ($l=10$ sec) and N is number of segments. The deep video retrieval model 106 pads the last segment if necessary. The deep video retrieval model 106 splits videos into segments in a sliding window fashion with segment stride $s_c \leq l$, thus $N=[\text{len}(X)/sc]$. In one or more implementations, the deep video retrieval model 106 set $s_c=l/2$. As described in greater detail below, the deep video retrieval model 106 uses segments as an atomic unit where a 'bag of features' is computed for each segment, also indexing and search are performed at the segment level.

In other words, as shown by FIG. 3A, the deep video retrieval model 106 sub-divides a video into equal-length segments. The deep video retrieval model 106 generates a set of visual descriptors 308 and audio descriptors 309 for each segment (e.g., from the video frames and audio corresponding to a given segment). The deep video retrieval model 106 independently computes these features from regularly sampled short temporal aggregation windows (AW) within a segment.

More specifically, the deep video retrieval model 106 sub-divides a video into visual segments 302 and audio segments 303. The deep video retrieval model 106 generates visual descriptors 308 for the visual segments 302 of the video utilizing a visual neural network encoder 304. The deep video retrieval model 106 generates audio descriptors 309 for the audio segments 303 of the video utilizing an audio neural network encoder 305.

More specifically, the deep video retrieval model 106 generates a visual segment embedding 306 from frames of a visual segment 302 of the video utilizing the visual neural network encoder 304. For example, the deep video retrieval model 106 generates frame embeddings 306 for each frame of a visual segment 302 of the video utilizing the visual neural network encoder 304. The deep video retrieval model 106 optionally averages the frame embeddings 306 for the visual segment 302 to generate a visual descriptor 308 for the visual segment 302.

Similarly, the deep video retrieval model 106 generates an audio segment embedding 307 from a temporal window (e.g., a one second sub-segment) of an audio segment 303 of the video utilizing the audio neural network encoder 305. For example, the deep video retrieval model 106 generates audio segment embeddings 307 (e.g., temporal window embeddings) for subperiods of an audio segment 303 of the video utilizing the audio neural network encoder 305. The deep video retrieval model 106 averages the audio segment embeddings 307 to generate an audio descriptor 309 for the audio segment 303. The deep video retrieval model 106 repeats the foregoing process to generate audio and video descriptors for each segment of the video.

As mentioned above, the deep video retrieval model 106 includes neural networks. Generally, in one or more implementations, a neural network includes a machine learning model that can be tuned (e.g., trained) based on inputs to approximate unknown functions used for generating the corresponding outputs. Indeed, in some implementations, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some implementations, a neural network includes a convolutional neural network, a recurrent neural network (e.g., a long short-term memory neural network), a generative adversarial neural network, a graph neural network, or a multi-layer perceptron. In some implementations, a neural network includes a combination of neural networks or neural network components.

The deep video retrieval model 106 extracts embeddings from visual and audio segments. In some instances, an embedding includes a set of values corresponding to latent and/or patent attributes and characteristics of an input analyzed by a neural network (e.g., a visual or audio segment). A descriptor is a combination of embeddings. For example, an audio descriptor is a combination of individual audio embeddings for sub-segments of an audio segment. Similarly, a video descriptor is a combination of individual frame embeddings of the frames of a visual segment. The deep video retrieval model 106 combines embeddings using average pooling, max pooling, concatenation, or another combination technique.

As alluded to earlier, a video circulated on the Internet may undergo certain transformations that affect either the visual or audio stream or both. For example, the visual stream may be subjected to quality reduction during reformatting, changes in aspect ratio/geometry, visual enhancements or editorial changes. Similarly, the audio stream could also be altered. The deep video retrieval model 106 treats such transformations as perturbations to the original video and learns a visual neural network encoder 304 and an audio neural network encoder 305 that generate embeddings that are robust to these perturbations.

In particular, the video comparison system 102 utilizes robust contrastive learning to train the deep video retrieval model 106. In particular, the video comparison system 102 learns parameters for the visual neural network encoder 304 and the audio neural network encoder 305 utilizing a contrastive loss with data augmentation.

For example, the video comparison system 102, in one or more implementations, trains a CNN model to encode a video frame or audio sub-segment into a compact embedding space. For example, in one or more implementations, each of the visual neural network encoder 304 and the audio neural network encoder 305 comprises a ResNet50 model architecture is with the N-way classifier layer replaced by a 256-D fully connected (fc) layer that serves as the embedding. In one or more implementations the deep video retrieval model 106 is trained with loss:

$$\mathcal{L}(z) = -\log \frac{e^{d(z,\bar{z}_+)/\tau}}{e^{d(z,\bar{z}_+)/\tau} + \sum_{k_-} e^{d(z,\bar{z}_-)/\tau}} \text{ where}$$

$$d(u, v) = \frac{g(u) \cdot g(v)}{|g(u)||g(v)|}$$

where z is the embedding of a video frame v: $z=f'(v) \in R256$; $\bar{z}_+$ is the average embedding of all transformations of v in the mini-batch; $z_-$ denotes other frame instances; $g(.)$ is a set of two MLP layers separated by ReLU that acts as a buffer between the embedding and the loss function; $d(u, v)$ measures the cosine similarity between the intermediate embeddings $g(u)$ and $g(v)$; $\tau$ is the contrastive temperature ($\tau=0.1$ in one or more implementations). $\mathcal{L}(.)$ aims to bring the embeddings of all transformations of an image (frame) together, while pushing away other image instances. In one or more embodiments, the deep video retrieval model 106 utilizes a contrastive loss similar to NTXent loss as described by Ting Chen, Simon Kornblith, Mohammad Norouzi, and Geffrey Hinton in A simple framework for contrastive learning of visual representations, International Conference on Machine Learning, pages 1597-1607, PMLR, 2020, incorporated by reference herein in its entirety, albeit that the deep video retrieval model 106 utilizes a loss that accepts multiple positives in a batch instead of just a single pair of image augmentations.

In one or more implementations, the deep video retrieval model 106 is initialized with weights from as described in co-pending U.S. patent application Ser. No. 17/804,376 filed on May 27, 2022 and entitled IDENTIFYING AND LOCALIZING EDITORIAL CHANGES TO IMAGES UTILIZING DEEP LEARNING, the entire content of which are hereby incorporated by reference in its entirety. During training, the video comparison system 102 randomly samples frames from the training videos to construct a batch. For each frame image the video comparison system 102 creates p augmentations to serve as positive samples (to compute $z^-+$), while the rest in the batch acts as negatives (the denominator term in the first loss equation). The video comparison system 102 empirically sets p=3 for optimal performance (improves by 1% as compared with standard NTXentLoss). It is noted that larger p causes a drop in performance, probably because the number of unique images in the batch must be reduced accordingly in order to fit a GPU.

Figure 5:
FIG. 5 illustrates video frames and benign transformations applied to video frames when learning parameters of a visual neural network encoder in accordance with one or more embodiments.

During training, the video comparison system 102 utilizes an exhaustive list of frame-level augmentations, including random Noise (variance 0.01), Blur (radius [0, 10]), Horizontal Flip, Pixelization (ratio [0.1, 1.0]), Rotation ([−30, +30] degrees), random Emoji Overlay (opacity [80, 100]%, size [10, 30]%, random position), Text Overlay (text length [5, 10], size [10, 20]%, random characters, typeface and position), Color Jitter (brightness, contrast and saturation [0.6, 1.4]), Padding ([0, 25]% dimension, random color). Because the deep video retrieval model 106 operates on individual video frames, all transformations are applied at frame level, i.e., the temporal coherence between frames are ignored during data augmentation. However, at test time, the deep video retrieval model 106 transforms query videos at a video level to reflect the video editing and distribution practice. FIG. 5 illustrates several benign transformations applied to an example video frame.

Figure 4:
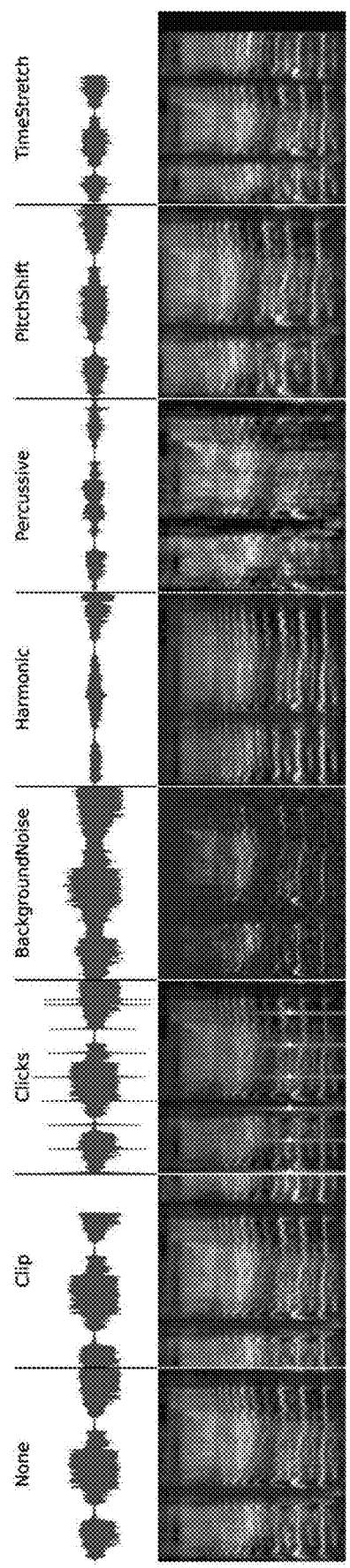
FIG. 4 illustrates audio segments and benign transformations applied to audio segments when learning parameters of an audio neural network encoder in accordance with one or more embodiments.

The deep video retrieval model 106 splits the audio signal of a video into overlapping 1-second segments and encodes the segments via log mel-spectrogram. The deep video retrieval model 106 visualizes the log mel-spectrogram as a 2D RGB image and treat the 2D RGB images as input to the audio neural network encoder 305 (e.g., audio model $f^a(.)$). The audio neural network encoder 305 and the visual neural network encoder 304 have the same model architecture and utilize the same loss for our training but utilize a different set of data augmentation methods to learn robust audio features. In general, the deep video retrieval model 106 utilizes benign audio transformations categorized in two groups—those that lengthen or shorten the audio signal and those that add, remove or alter audio components. The former includes audio Clipping ([0, 20]% audio length) and Time Stretching (slow down 0.5×-speed up 1.5×). The latter includes Adding Clicks (random click rate 0.5 sec-full length), Adding Background Noise (SNR 5 db), Filtering Harmonics (margin [1.0, 1.5]), Filtering Percussive (margin [1.0, 1.5]) and Pitch Shifting (semitone [−5, 5]). These transformations are commonly encountered during audio redistribution and editing practice. FIG. 4 shows the effects of these transformations on an example audio segment. In particular, the top row shows magnitude and the bottom row shows mel-spectrogram of an audio segment and random benign trans-formations used during training the audio neural network encoder.

FIG. 3A illustrates that the visual neural network encoder 304 generating frame embeddings 306 for each frame of a visual segment 302 and then combining the frame embeddings to generate a visual descriptor 308 for the visual segment. In alternative implementations, the visual neural network encoder 304 generates a visual segment embedding for a combination of frames of a visual segment of a video utilizing the visual neural network encoder 304 by taking an entire segment of frames (e.g., 16) as a concatenated input and outputting a single visual segment embedding that is utilized as a visual descriptor 308 for the visual segment.

More specifically, in one or more implementations, when generating the segment features or descriptors for a given video segment $x_i=\{x_i^v, x_i^a\}$ containing a visual stream $x_i^v$ and an audio stream $x_i^a$ of the same length l, the deep video retrieval model 106 feeds the two streams into the respective visual neural network encoder 304 and audio neural network encoder 305 to generate a set of descriptors for both streams. For the visual stream, the deep video retrieval model 106 samples $x_i^v$ at 16 frames per second with stride $s_f(s_f=0.5$ second or 8 frames) and extracts average CNN features or embeddings on every 16-frame aggregation window (AW) to generate one visual descriptor per second. In particular, the deep video retrieval model 106 utilizes a visual aggregation function:

$$z_i^v = \mathcal{F}^v(X_i^v) \in \mathbb{R}^{n \times 256}, \quad n = \left\lceil \frac{l}{s_f} \right\rceil$$

at sampling point $jF^v(x_{i,j}^v) = \frac{1}{16}\Sigma_{t=0}^{15} F^v(x_{i,j+t}^v)$; n is number of visual descriptors per segment.

For the audio stream, the audio neural network encoder has input size of 1 second audio length, we sample $x_i^a$ at 1 second intervals with the same stride sf as used for the visual neural network encoder utilizing the audio aggregation function:

$$z_i^a = f^a(x_i^a) \in \mathbb{R}^{n \times 256}$$

This makes the audio extraction in sync with the visual extraction process (both have an aggregation window of 1 second), resulting in the same number of audio and visual descriptors per video segment $x_i$.

In any event, as illustrated by FIG. 3A, the deep video retrieval model 106 quantizes the visual and audio descriptors to create a dictionary or codebook of codewords upon which an inverse index is built to index videos at a segment level. FIG. 3A illustrates that before quantizing the visual and audio descriptors, the deep video retrieval model 106 fuses the visual and audio descriptors utilizing early fusion 310. In particular, utilizing early fusion 310, the deep video retrieval model 106 generates a single codebook constructed for $z=[z_i^v, a_i^v] \in \mathbb{R}^{512}$, which is a concatenation of the visual and audio descriptor of a single aggregation window.

Similar to text search systems, the deep video retrieval model 106 constructs an inverse index 314 that supports video retrieval at a segment-level. In particular, the deep video retrieval model 106 samples 1M random descriptors (audio, visual, or fused) and builds a dictionary with codebook 315 size K using K-Means. The deep video retrieval model 106 builds the inverse index 314 as a vocabulary of K codewords 312a, 312b, 312c. As shown the inverse index 314 includes, for each codeword, a list of video segment from each known video that includes the codeword. Thus, the K codewords are used as entries to the inverse index 314, listing all segments in the database (a mapping between segments and video IDs are also stored).

As explained below, having generated the inverse index 314, the deep video retrieval model 106 utilizes the inverse index 314 to match a query video to one or more known videos. In particular, given a query video, the deep video retrieval model 106 breaks the query video into segments, where each segment is mapped to a codeword. Thus, the query video is represented as a bag of codewords. The deep video retrieval model 106 identifies all of the segments from all of the known videos that include the codewords corresponding to the query video. The deep video retrieval model 106 then ranks the subsets of known videos that include the codewords corresponding to the query video.

For example, the deep video retrieval model 106 determines a relevance of a query segment $q=\{q_1, q_2, \ldots, q_n\}$ to a database segment $x_i$ by determining a segment relevance score $R_s$, defined as:

$$\mathcal{R}(q, x_i) = \sum_{t=1}^{n} tf(q_t, x_i) \times idf(q_t)$$

where tf $(q_t, x_i)$ is the codeword frequency that denotes the number of times codeword $q_t$ appears in the video segment $x_i$ and ivf $(q_t)$ is an inverse video frequency, which measures how common $q_t$ is across all of the segments in the dataset. Thus, the deep video retrieval model 106 determines a codeword frequency indicating a number of times the codeword appears in a video segment of a known video and also determines an inverse video frequency that measures how common the codeword is across all video segments in the inverse index.

Additionally, the deep video retrieval model 106 determines a video relevance of a query video Q to a database video X, defined as:

$$\mathcal{R}(Q, X) = \sum_{q}^{Q} \sum_{x_i}^{X} \mathcal{R}(q, x_i)$$

In particular, the deep video retrieval model 106 determines a video relevance score by summing segment relevance scores between the video segments of the known video and the mapped codewords. The deep video retrieval model 106 ranks a subset of known videos from the plurality of known videos corresponding to the determined video segments of the query video based on the video relevance scores.

As shown by FIG. 3A, the deep video retrieval model 106 also performs re-ranking 316 of the subset of known videos from the plurality of known videos corresponding to the determined video segments of the query video. For example, the deep video retrieval model 106 performs edit distance re-ranking of the subset of known videos. In particular, in one or more implementations, the inverse index does not take into account the order of descriptors within a segment, and segment order within a video. In one or more embodiments, the deep video retrieval model 106 utilizes the video relevance scores to retrieve top-n candidate videos (n=200) before performing an additional re-ranking stage based on edit distance. For example, the deep video retrieval model 106 utilizes Levenshtein distance which quantifies the similarity between two sequences by counting the number of edits (insertions, deletions or substitutions) required to turn one sequence into the other. Sorting by edit distance promotes the top videos in which visual words appear in the order that matches the query video the closest. The deep video retrieval model 106 then returns a subset of known videos 320 similar to the query video based on the edit distance re-ranking 316.

The deep video retrieval model 106 enables retrieval even if the query video is only a segment of a database video by utilizing segmenting and the inverse index 314. As a by-product, the deep video retrieval model 106 also supports localization of a video segment by searching for the closest segment in the database, or even the closest codeword within a segment for more fine-grained localization.

Figure 6:
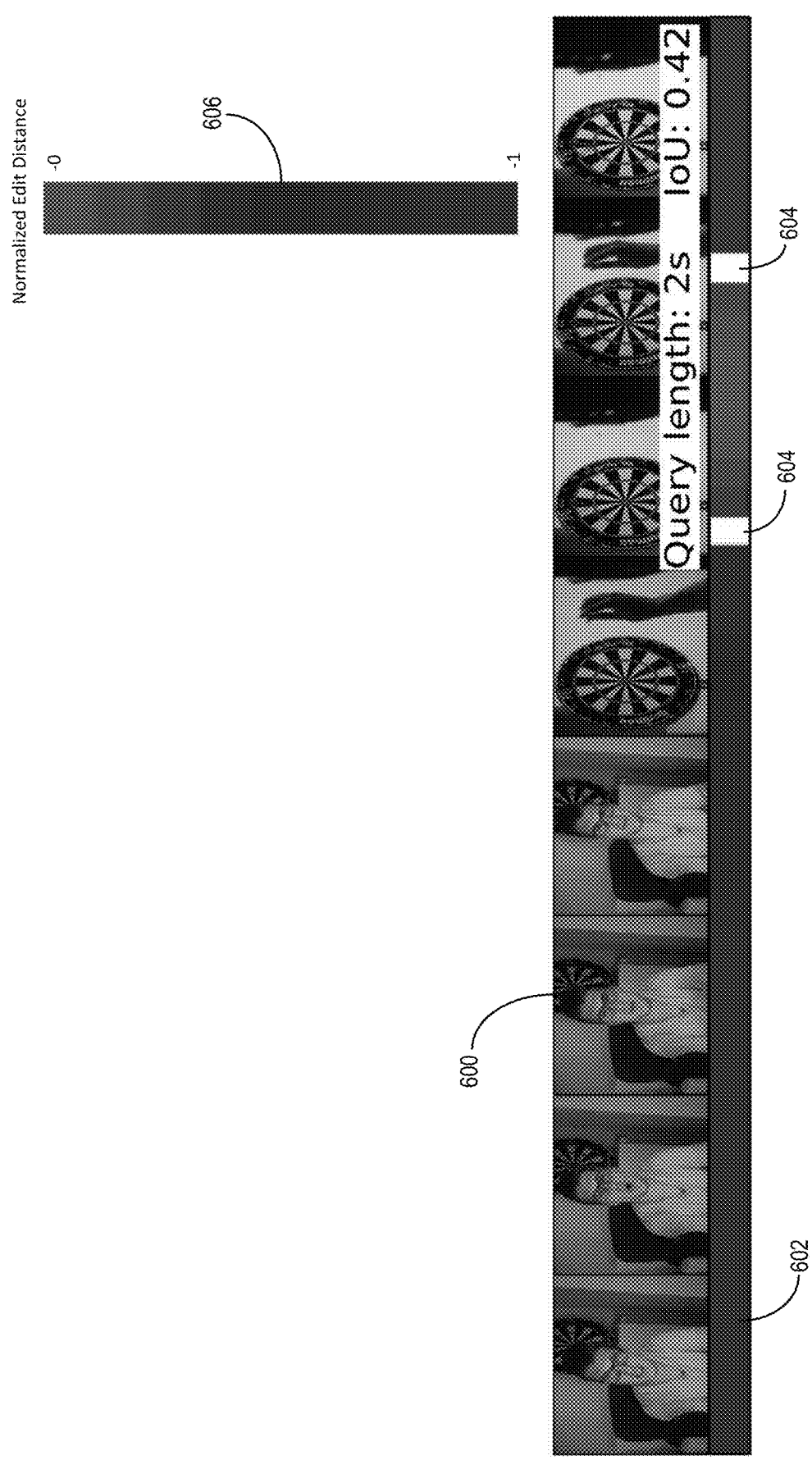
FIG. 6 illustrates a known video match to a query video and a heatmap bar localizing the query video within the known video in accordance with one or more embodiments.

For example, FIG. 6 illustrates a results graphical user interface showing a top result of a provenance search of for a query video performed by the deep video retrieval model 106. The results graphical user interface includes frames of the top known video 600 along with a heatmap bar 602 localizing the query video within the known video 600. In particular, the query video is localized between two blank markers 604 in the heatmap bar 602. As shown the heatmap bar 602 is based on a normalized edit distance as shown by ranking bar 606. In particular, the heatmap bar shows the edit distance between the query sequence of codewords and a same-length segment of the candidate video in sliding window fashion, which represents the confidence in localization of the query within the candidate video. An IoU score is determined over a thresholded heatmap and the ground truth location.

Figure 3B:
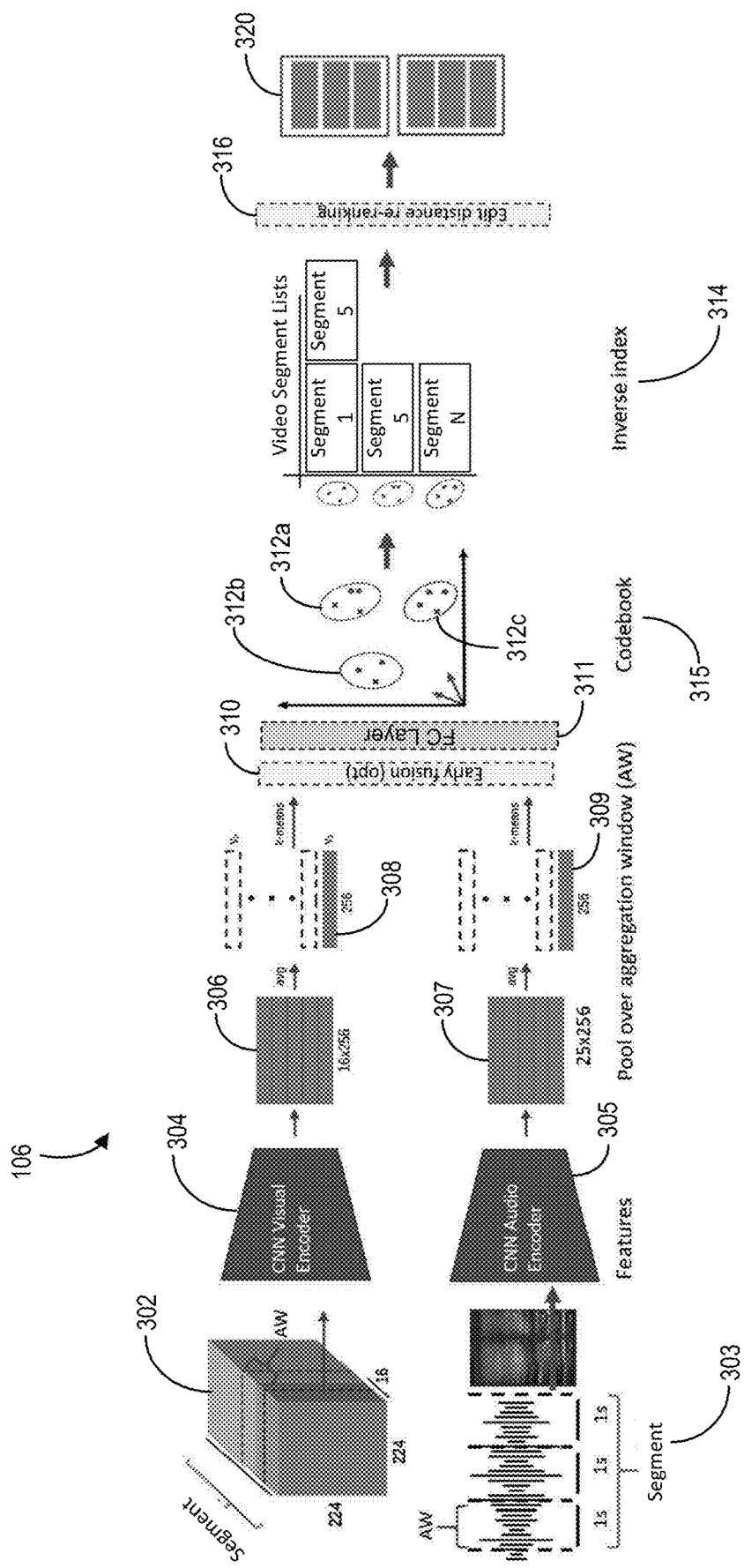
FIG. 3B illustrates another example architecture of a deep video retrieval model of the video comparison system in accordance with one or more embodiments.

As noted above, FIG. 3A illustrates an implementation of the deep video retrieval model 106 including early fusion 310. In alternative implementations, the deep video retrieval model 106 includes learned fusion rather than early fusion 310. For example, FIG. 3B illustrates an implementation of the deep video retrieval model 106 similar to that of FIG. 3A, albeit that the deep video retrieval model 106 of FIG. 3B includes learned fusion 311 rather than early fusion 310. In particular, the deep video retrieval model 106 learn a unified audio-visual embedding for a video AW. Since the visual model f'(.) operates at frame-level, the video retrieval model 106 with learned fusion averages the embeddings of the frames within an AW to represent the visual feature of that AW, before concatenating with the audio feature and projecting to the unified embedding according to:

$$z = E_p \left( \left[ \frac{1}{|AW|} \sum_{x^v}^{AW} f^v(x^v), f^a(x^a) \right] \right) \in \mathbb{R}^{256}$$

where $E_p$ is a fully-connected layer for dimensional reduction; [,] is a concatenation; |AW| is number of frames in an AW (to make the model small, the deep video retrieval model 106 samples video at 4 fps, thus |AW|=4). To train the fully-connected layer 311, the fully-connected layer first trains the audio and visual neural network encoders separately, then use their weights to initialize a joint model training.

Figure 3C:
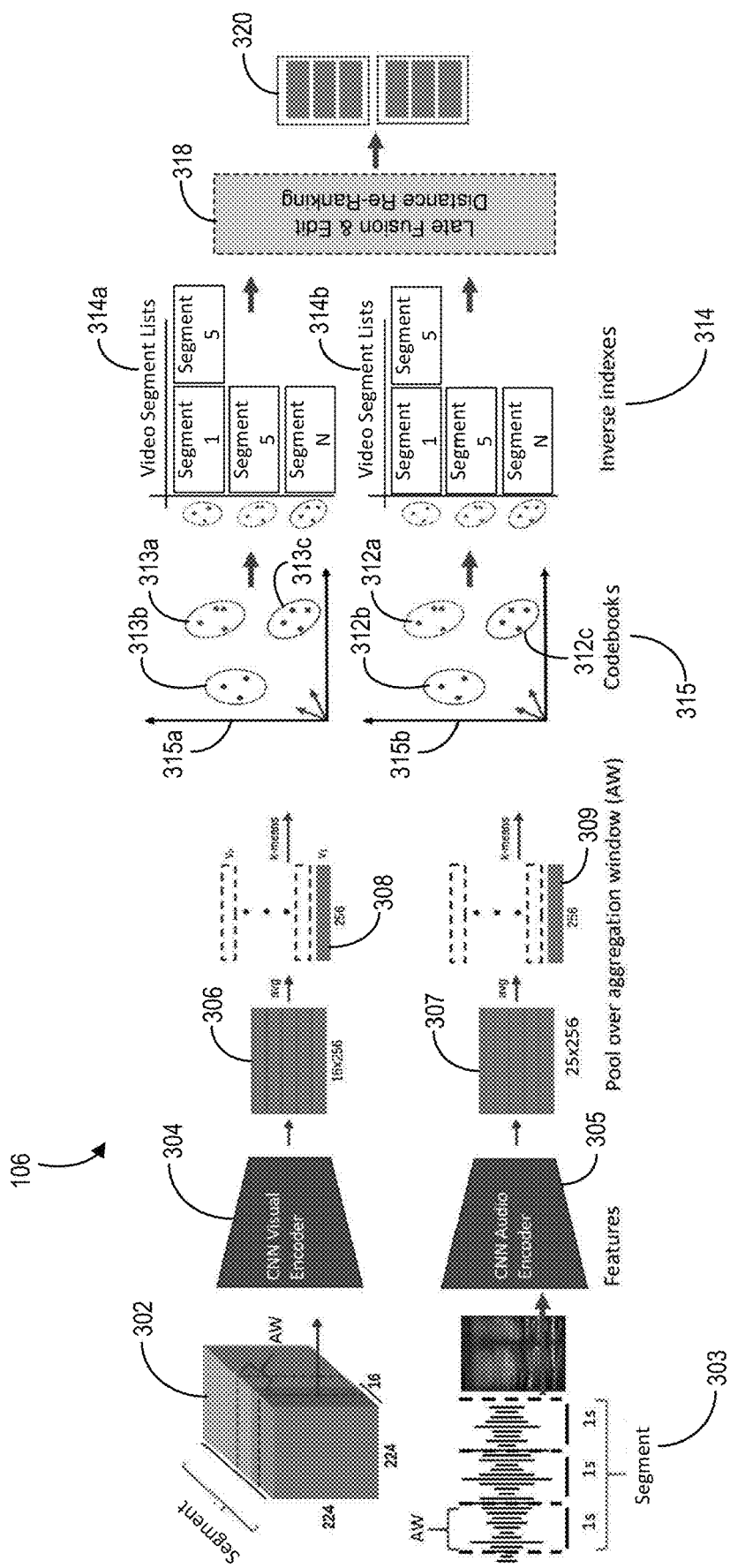
FIG. 3C illustrates yet another example architecture of a deep video retrieval model of the video comparison system in accordance with one or more embodiments.

In still further implementations, the deep video retrieval model 106 utilizes late fusion rather than early fusion or learned fusion. For example, FIG. 3C illustrates an implementation of the deep video retrieval model 106 similar to that of FIG. 3A, albeit that the deep video retrieval model 106 of FIG. 3C includes learned fusion 318 rather than early fusion 310. Due to the late fusion, the deep video retrieval model 106 of FIG. 3C further includes multiple codebooks 315a, 315b and multiple inverse indexes 314a, 314b.

In particular, as shown by FIG. 3C, the deep video retrieval model 106 builds separate codebooks 315a, 315b and inverse indexes 314a, 314b for the audio and visual domains. Nonetheless, the deep video retrieval model 106 of FIG. 3C determines the relevance scores and re-ranking jointly. In particular, as illustrated by FIG. 3C, the deep video retrieval model 106 maps the visual descriptors 308 to visual codewords 313a, 314b, 314c. Additionally, the deep video retrieval model 106 maps the audio descriptors 309 to audio codewords 312a, 312b, 312c. The deep video retrieval model 106 identifies known video segments utilizing a visual inverse index 314a based on the visual codewords. The deep video retrieval model 106 identifies known video segments utilizing an audio inverse index 314b based on the audio codewords.

Evaluators performed experiments to determine which fusion method (early fusion FIG. 3A, learned fusion FIG. 3B, or late fusion FIG. 3C) performs better. Table 1 below indicates the superiority of the late fusion method, with 98% recall at top-1 and near perfect performance at top-100. Learned fusion method has better score than early fusion but lower than late fusion, probably because the unified embedding and inverse index are effectively twice as compact as the combined audio and visual. Another advantage of late fusion is that it enables querying of individual modality, for example in case a user only has single-modal data or prefer to retrieval an individual stream. Furthermore, audio and visual retrieval has complementary effects, as the late fusion method improves performance versus any single-stream retrieval method.

TABLE 1

| Method | R@1 | R@10 | R@100 |
| --- | --- | --- | --- |
| Late fusion | 0.982 | 0.991 | 0.996 |
| Learned fusion | 0.941 | 0.949 | 0.956 |
| Early fusion | 0.789 | 0.842 | 0.913 |

In addition to the foregoing, Table 2 illustrates the results of ablation experiments to test the efficacy of the retrieval pipeline when stripping off one or several components. First experiment turned off the re-ranking stage and ranked the results using only the video relevance scores. Without re-ranking the recall score significantly drops by 18% at R@1. This indicates that re-ranking promotes the relevant video to the top of the ranking by leveraging the temporal sequence of codewords within a sequence (and sequence of segments within a longer video). Next, the experiments further turned off TF-IDF ranking (generation of video relevance scores) and use only the histogram count of codewords in the inverse indexes to rank the videos. The performance further reduces by 3% at R@1.

TABLE 2

| Method | R@1 | R@10 | R@100 |
| --- | --- | --- | --- |
| proposed | 0.982 | 0.991 | 0.996 |
| w/o re-ranking | 0.798 | 0.984 | 0.995 |
| w/o TF-IDF + re-ranking | 0.764 | 0.982 | 0.992 |

Figure 7:
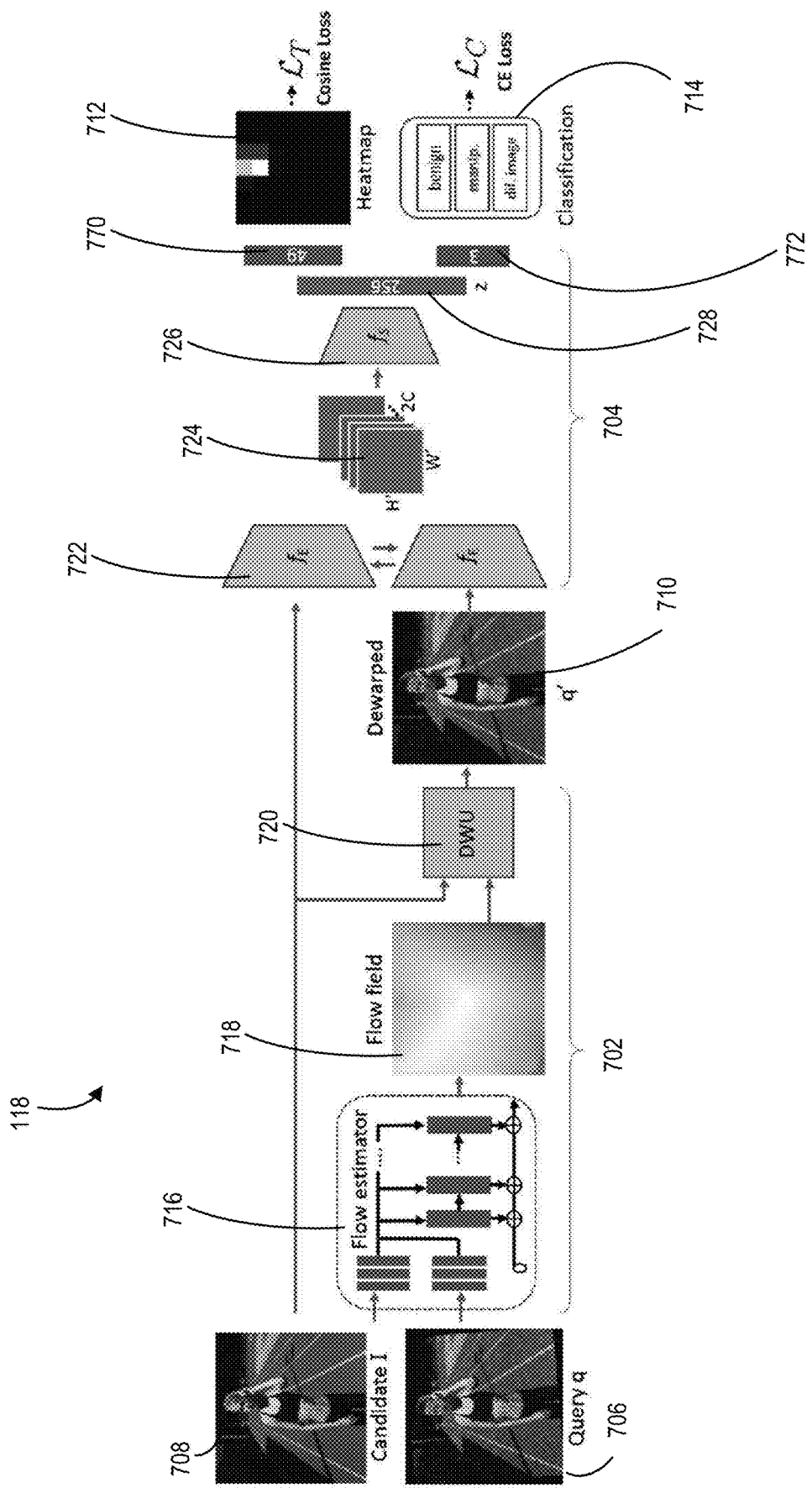
FIG. 7 illustrates an example architecture of a deep video comparator model in accordance with one or more embodiments.

In addition to identifying a source video for a query video, the video comparison system also is able to localize editorial changes in query videos relative to source videos. FIG. 7 provides additional detail regarding the deep video comparator model 118. Specifically, FIG. 7 illustrates that the deep video comparator model 118 includes a geometric alignment model 702 and a prediction model 704. The deep video comparator model 118 receives a query or first video 706 to compare with a second or known video 708. The deep video comparator model 118 utilizes the geometric alignment model 702 to generate an aligned or dewarped video 710. The prediction model 704 then compares the aligned video 710 to the known video 708 by extracting deep features from both the known video 708 and the aligned video 710. Based on the deep features, the prediction model 704 generates a heat map 712 that localizes editorial changes and a 3-way classification 714 that indicates whether the query video 706 includes benign changes, editorial changes, or is a completely different video.

In practice, the query video 706 may undergo transformations which alter the pixel placement relative (e.g., affine transformations or padding). To increase editorial change accuracy and make the deep video comparator model 118 more robust to benign modifications, the deep video comparator model 118 utilizes the geometric alignment model 702 to correct the alignment of the query video 706 relative to the source or known video 708. In particular, the deep video comparator model 118 utilizes an optical flow estimator 716 to estimate the optical flow or flow field 718 between the query video 706 and the known video 708.

As used herein, the term "optical flow estimate" or "estimated flow field" refers to motion of pixels needed to realistically transform or align the pixels of two videos. In particular, the optical flow estimate includes data related to the movement and direction of pixels in the query video 706 needed to align them with corresponding pixels in the known video 708.

In one or more implementations, the optical flow estimator 716 comprises an optical flow prediction network. As used herein, the term "optical flow prediction network" refers to a neural network that is trained using a flow loss function and a ground truth flow to predict the optical flow prediction (e.g., the optical flow input) between videos. In one or more implementations, the optical flow estimator 716 comprises an optical flow prediction network as described in U.S. Pat. No. 10,787,622 assigned to Adobe Inc., which is hereby incorporated by reference in its entirety. Alternatively, the optical flow estimator 716 comprises a video alignment system as described in U.S. Pat. No. 10,457,204 assigned to Adobe Inc., which is hereby incorporated by reference in its entirety. In still further implementations, the optical flow estimator 716 comprises a recurrent all-pairs transform for optical flow as described by Teed et al., in *Recurrent All-Pairs Field Transforms for Optical Flow*, In Proc. ECCV, pages 402-419, Springer, 2020, which is hereby incorporated by reference.

In one or more implementations the optical flow estimator 716 determines the alignment between the query video 706 or "q" and the known video 708 or ("I"). For example, the optical flow estimator 716 resizes both the query video 706 and the known video 708 to a fixed height (H) and a fixed width (W). The optical flow estimator 716 determines a dense pixel displacement field $\{\rho^x, \rho^y\} \in R^{H \times W}$ from q to I by computing correlation between the per-pixel features from all pairs of pixels.

Upon generating the optical flow estimate or flow field 718 the deep video comparator model 118 utilizes a de-warping unit 720 to apply the optical flow estimate 718 to the query video 706 to align the query video 706 to the known video 708. For example, the de-warping unit 720 warps by query video 706 by:

$$M: (x,y) \rightarrow (x+\rho^x(x), y+\rho^y(y))$$

$$DWU(q|\rho^x, \rho^y) = S(M) \in R^{H \times W}$$

where (x, y) refers to the pixel coordinates in the query video q which are mapped into its estimated correspondence M according to the optical flow $\{\rho^x, \rho^y\}$. S(.) is a bilinear sampler that effectively fits a local grid around M: S(M) =$\{M+\Delta M | \Delta M \in R^2, |\Delta M| <=1\}$ where output coordinates are computed by linear interpolation. Thus, the de-warping unit 720 generates the aligned query video 710.

The known video 708 and the aligned query video 710 are then provided as inputs to the prediction model 704. In one or more implementations the prediction model 704 comprises a neural network. Generally, in one or more implementations, a neural network includes a machine learning model that is tunable (e.g., trained) based on inputs to approximate unknown functions used for generating the corresponding outputs. Indeed, in some implementations, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some implementations, a neural network includes a convolutional neural network, a recurrent neural network (e.g., a long short-term memory neural network), a generative adversarial neural network, a graph neural network, or a multi-layer perceptron. In some implementations, a neural network includes a combination of neural networks or neural network components.

The prediction model 704 extracts features or feature maps from each of the known video 708 and the aligned query video 710. For example, the prediction model 704 utilizes a neural network feature extractor 722 to generate feature maps 724. To illustrate, in some instances, a feature map 724 includes a set of values corresponding to latent and/or patent attributes and characteristics of an input analyzed by a neural network (e.g., a digital video). In particular, the deep video comparator model 118 generates a first set of deep features (e.g., a first set of feature maps) for the aligned query video 710 utilizing the neural network feature extractor 722. The deep video comparator model 118 generates a second set of deep features (e.g., a second set of feature maps) for the source video 708 utilizing the neural network feature extractor 722. For example, the deep video comparator model 118 extracts local features from each of the known video 708 and the aligned query video 710 using a shared CNN extractor. The feature maps 724 include H', W', and C, which are the new height, width, and feature dimension respectively. In one or more implementations, the neural network feature extractor 722 is 7 convolution layers separated by ReLU, batch norm and max pooling and outputs features at a ¼ resolution and C=128.

The deep video comparator model 118 then combines the feature maps 724 of the known video 708 and feature maps 724 of the aligned query video 710. For example, the concatenates the feature maps 724 of the known video 708 and feature maps 724 of the aligned query video 710. In other words, the deep video comparator model 118 generates a combination of the first set of deep features extracted from the aligned query video 710 and the second set of deep features extracted from the known video 708.

The deep video comparator model 118 generates a fused feature vector 728 or z from the combined feature maps 724 utilizing a neural network encoder 726. For example, in one or more implementations, the neural network encoder 726 comprises four ResNet residual blocks followed by average pooling and a fully connected layer that outputs a 256-dimension fused feature vector 728.

The deep video comparator model 118 generates one or more visual indicators from the fused feature vector 728 utilizing one or more neural network layers 770. For example, the deep video comparator model 118 generates a heat map 712 from the fused feature vector 728 utilizing a multilayer perceptron 770. As used herein, a "heat map" refers to a graphical representation of data that conveys data indicating an editorial change or modification. In particular, a heat map can comprise a map of a video that indicates portions of the video likely to include an editorial change or modification. For example, every region of the heat map (e.g., every pixel) conveys a likelihood that the given pixel is part of an editorial change or modification.

Additionally, the deep video comparator model 118 generates a classification for modifications of the query video 706 relative to the known video 708. In particular, the deep video comparator model 118 generates a three-way classification 714 comprising a probability that the query video 706 has benign changes, a probability that the query video 706 has editorial changes; and a probability that the query video 706 is a different video from the known video 708. For example, the deep video comparator model 118 generates the classification from the fused feature vector 728 utilizing one or more additional neural network layers (e.g., a multilayer perceptron) 772.

To predict the query-candidate relationship and visualize the possible manipulated regions, the deep video comparator model 118 applies two losses on top of the fused feature vector 728 or z. The first loss is a 3-way cross entropy predicting whether the pair is benign (i.e., the query q is either identical or a benign transformed version of the candidate I), manipulated (i.e., q is a manipulated version of I) or of distinct videos (i.e., I and q are two different instances). For example:

$$c = E_c(z) \in \mathbb{R}^3$$

$$\mathcal{L}_C = -\log \frac{e^{c_y}}{\sum_{i=1}^{3} e^{c_i}}$$

where $E_c(.)$ is a FC layer projecting z to a 3-D feature c, and y is the classification target of the pair (q, I). $L_c$ is the first loss or classification loss.

The deep video comparator model 118 utilizes a second loss to minimize the cosine distance between the manipulation heatmap derived from z and the ground truth heatmap. The deep video comparator model 118 produces a heatmap at resolution t×t from z via a FC layer, $E_t(z) \in \mathbb{R}^{t^2}$ and compute a heatmap loss:

$$\mathcal{L}_T = 1 - \frac{E_t(z) \cdot T}{|E_t(z)||T|}$$

where T is the ground truth manipulation heatmap. T is a matrix of zeros if the pair (q,I) is benign, ones if different (distinct), and if a manipulated pair $T \in [0, 1]$ derived from ground truth annotations. The output heatmap is generated at a resolution t=7 during training. At test time, the 7×7 heatmap is interpolated to the original resolution H×W and super-imposed on the query video to generate the one or more visual indicators. In one or more implementations, the heat map is continuous but can be thresholded for more intuitive visualization. The total loss for the deep video comparator model 118 loss is:

$$\mathcal{L}_{(.)} = w_c \mathcal{L}_c(.) + w_t \mathcal{L}_T(.)$$

where loss weights $w_c$ and $w_t$ are optimized or set empirically at 0.5.

Figure 8:
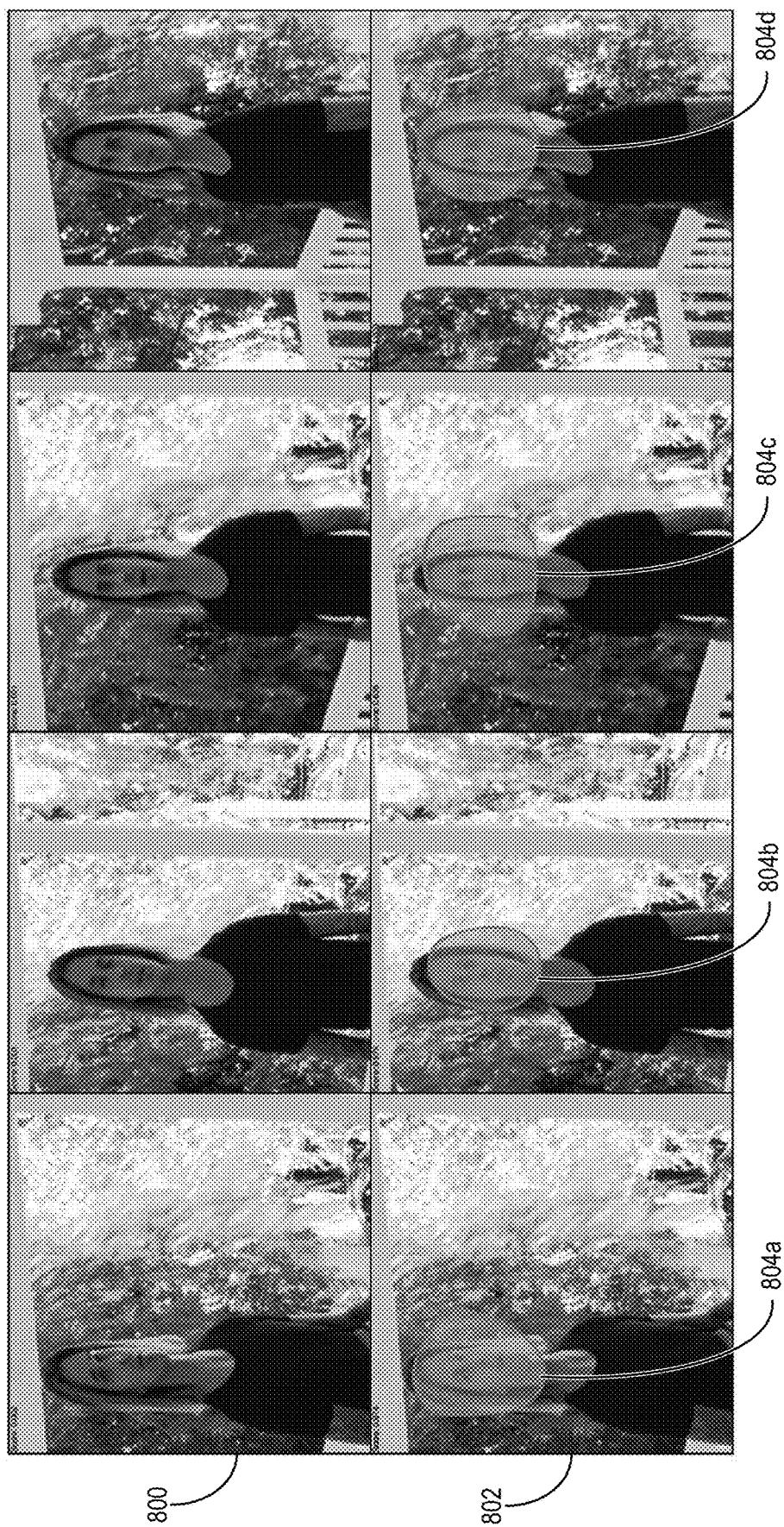
FIG. 8 illustrates a deep video comparator model determining and visually localizing editorial image modifications in a query video in accordance with one or more embodiments.

FIG. 8 illustrates and example output of the deep video comparator model 118. In particular, FIG. 8 illustrates frames of a known video 800 and corresponding frames of a query video 802 comprising one or more editorial modifications. The deep video comparator model 118 identifies and provides a visual indication of editorial changes in the query frames relative to the known frames. For example, FIG. 8 illustrates that the deep video comparator model 118 highlights a region of each query frame with a visual indicator 804a, 804b, 804c, 804d. The visual indicators identify the location of the editorial modification in the query video 802 relative to the known video 800. Furthermore, the deep video comparator model 118 identifies the editorial modifications while ignoring the benign modifications/transformations (e.g., warping and blurring).

In one or more implementations, the deep video comparator model 118 generates visual indicators 804a-804d by generating a heat map 712 from the fused feature vector utilizing a multilayer perceptron as described above in relation to FIG. 7. The deep video comparator model 118 overlays the visual indicators 804a-804d on the frames of the query video 802 based on the heat map 712. As shown the visual indicators 804a-804d can comprise a filter that changes a color of pixels of a video frame. Alternatively, the visual indicators 804a-804d comprise a semitransparent overlay that the deep video comparator model 118 overlays on the frames of a video. In still further implementations, the deep video comparator model 118 generates other types of visual indications to provide a location of editorial changes.

Figure 9:
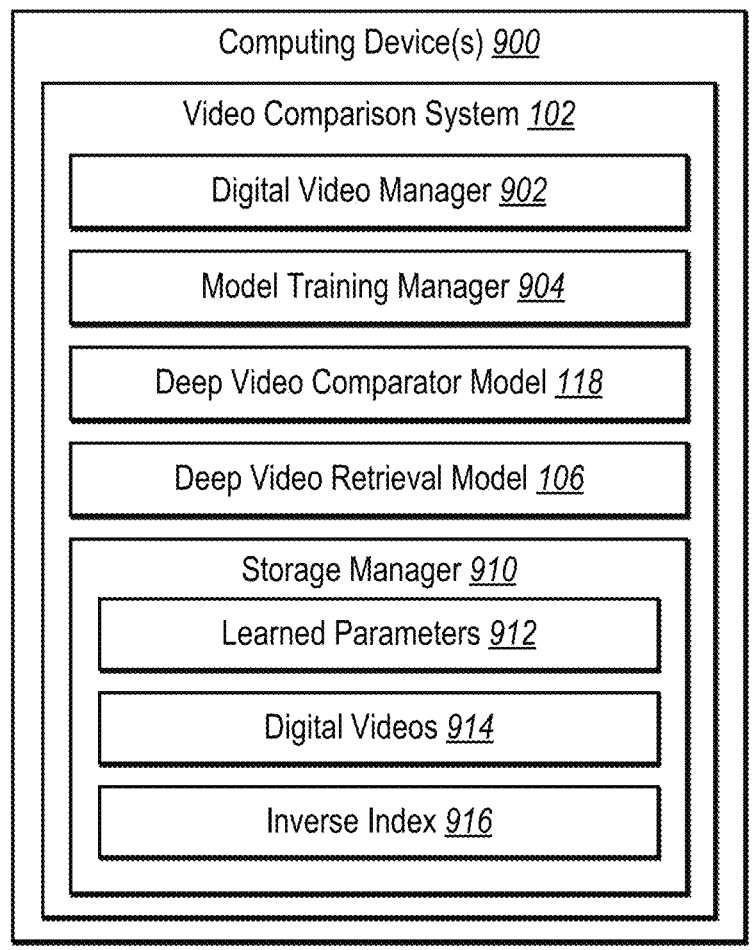
FIG. 9 illustrates a schematic diagram of a video comparison system in accordance with one or more embodiments.

Looking now to FIG. 9, additional detail will be provided regarding components and capabilities of the video comparison system 102. Specifically, FIG. 9 illustrates an example schematic diagram of the video comparison system 102 on an example computing device 900 (e.g., one or more of the client device 112 and/or the server(s) 104). As shown in FIG. 9, the video comparison system 102 includes a digital video manager 902, a model training manager 904, a deep video retrieval model 106, a deep video comparator model 118, and a storage manager 910.

As just mentioned, the video comparison system 102 includes the digital video manager 902. The digital video manager 902 can collect, identify, retrieve, and/or modify digital videos. For example, the digital video manager 902 can collect digital videos and monitor interactions, modifications and/or revisions corresponding to a digital video.

As shown in FIG. 9, the video comparison system 102 also includes the model training manager 904. The model training manager 904 can train, learn, and/or generate parameters of the deep video retrieval model 106 and/or the deep video comparator model 118. As discussed above, the model training manager 904 trains a deep video retrieval model. For example, the model training manager 904 can utilize robust contrastive learning to learn parameters of the deep video retrieval model 106 (e.g., parameters of the neural network encoders of the deep video retrieval model 106). Similarly, the model training manager 904 utilizes a 3-way cross entropy loss and a cosine distance loss to learn parameters of the deep video comparator model 118.

In addition, as illustrated in FIG. 9, the video comparison system 102 can also include the storage manager 910. The storage manager 910 can include one or more memory devices for storing information related to the video comparison system 102. For instance, as shown, the storage manager 910 can store, recall, and/or maintain learned parameters 912 (e.g., learned parameters of a deep video comparator or retrieval models), digital videos 914 (e.g., known or training digital videos), and inverse index 916.

In one or more embodiments, each of the components of the video comparison system 102 are in communication with one another using any suitable communication technologies. Additionally, the components of the video comparison system 102 are in communication with one or more other devices including one or more client devices described above. It will be recognized that although the components of the video comparison system 102 are shown to be separate in FIG. 9, any of the subcomponents may be combined into fewer components, such as into a single component, or divided into more components as may serve a particular implementation. Furthermore, although the components of FIG. 9 are described in connection with the video comparison system 102, at least some of the components for performing operations in conjunction with the video comparison system 102 described herein may be implemented on other devices within the environment.

FIGS. 1-9 the corresponding text, and the examples provide a number of different systems, methods, and non-transitory computer readable media for matching query videos to known videos in a manner robust to transformations. In addition to the foregoing, embodiments can also be described in terms of flowcharts comprising acts for accomplishing a particular result. For example, FIG. 10 illustrates a flowchart of an example sequence or series of acts for identifying a known video corresponding to a query video utilizing a deep video comparator model in accordance with one or more embodiments. Similarly, FIG. 11 illustrates a flowchart of an example sequence or series of acts for generating an inverse index for identifying known video corresponding to query videos in accordance with one or more embodiments.

Figure 11:
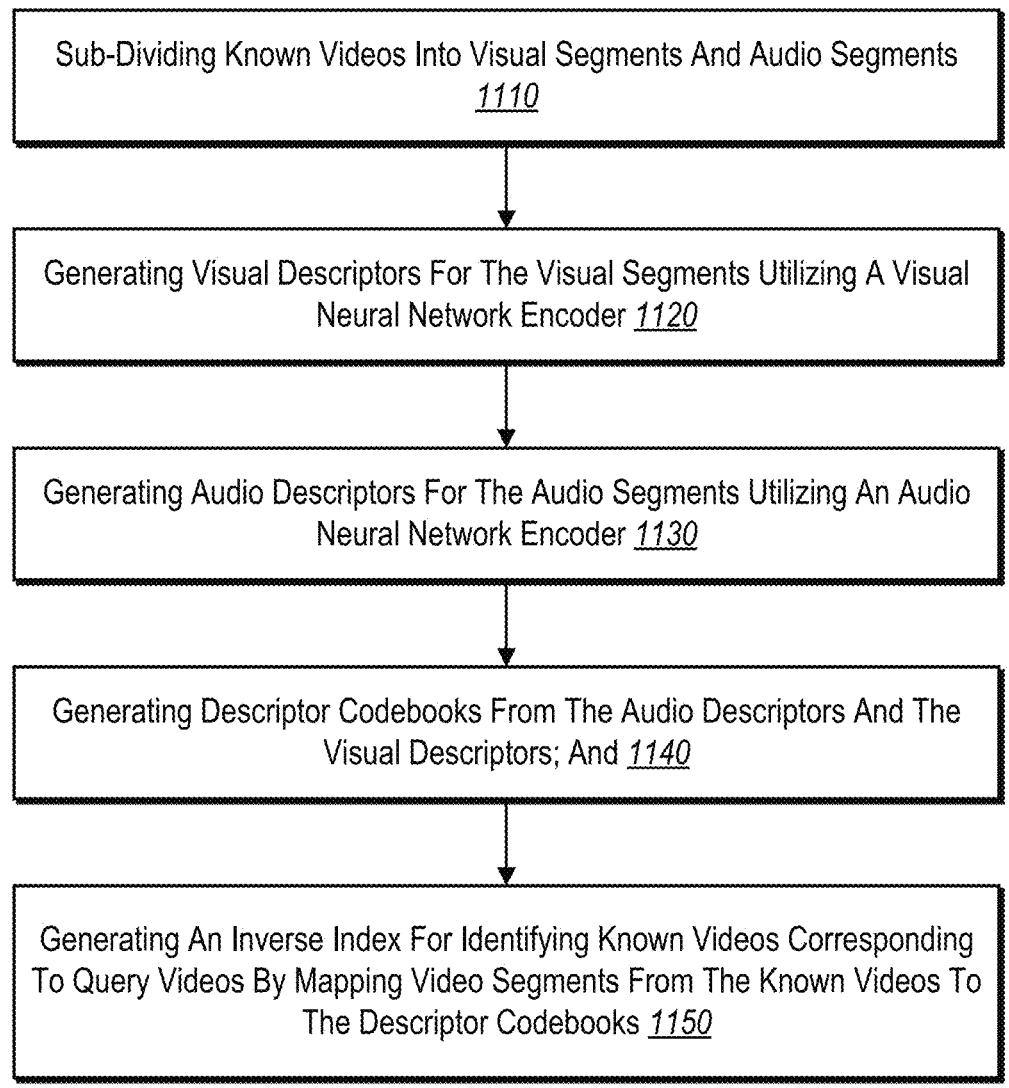
FIG. 11 illustrates a flowchart of a series of acts for generating an inverse index for identifying known video corresponding to query videos in accordance with one or more embodiments.

While FIGS. 10-11 illustrates acts according to particular embodiments, alternative embodiments may omit, add to, reorder, and/or modify any of the acts shown in FIGS. 10-11. The acts of FIGS. 10-11 can be performed as part of a method. Alternatively, a non-transitory computer readable medium can comprise instructions, that when executed by one or more processors, cause a computing device to perform the acts of FIGS. 10-11. In still further embodiments, a system can perform the acts of FIG. 10-11. Additionally, the acts described herein may be repeated or performed in parallel with one another or in parallel with different instances of the same or other similar acts.

FIG. 10 illustrates an example series of acts 1000 for identifying a known video corresponding to a query video utilizing a deep video comparator model in a video in accordance with one or more embodiments. In particular, the series of acts 1000 includes an act 1010 of generating visual descriptors for visual segments of a query video utilizing a visual neural network encoder. In one or more implementations, act 1010 involves utilizing a visual neural network encoder that is robust to benign visual perturbations. In one or more embodiments, act 1010 involves sub-dividing a query video into visual segments and audio segments. Specifically, in one or more embodiments, act 1010 involves subdividing the query video into equal-length visual and audio segments. Act 1010 optionally involves generating a visual segment embedding for a combination of frames of a visual segment of the query video utilizing the visual neural network encoder. Additionally, or alternatively, act 1010 involves generating a visual segment embedding for a combination of frames of a visual segment of the query video utilizing the visual neural network encoder. Still further, act 1010 optionally involves generating frame embeddings for each frame of a visual segment of the query video utilizing the visual neural network encoder. In such embodiments, act 1010 also involves averaging the frame embeddings for the visual segment to generate a visual descriptor for the visual segment.

As illustrated, the series of acts 1000 also includes an act 1020 of generating audio descriptors for audio segments of the query video utilizing an audio neural network encoder. In one or more implementations, act 1020 involves utilizing an audio neural network encoder that is robust to benign audio perturbations. In particular, act 1020, in one or more embodiments, involves generating temporal window embeddings for subperiods of an audio segment of the query video utilizing the audio neural network encoder. Act 1020 also involves averaging the temporal window embeddings for the audio segment to generate an audio descriptor for the audio segment.

Moreover, as shown in FIG. 10, the series of acts 1000 can include the act 1030 of determining video segments from a plurality of known videos that are similar to the query video based on the visual descriptors and audio descriptors utilizing an inverse index. For example, act 1030 involves mapping the visual descriptors and the audio descriptors to one or more descriptor codebooks. Moreover, act 1030 involves identifying the video segments from the plurality of known videos based on a mapped descriptor codebook.

Additionally, in one or more embodiments, act 1030 involves fusing the visual descriptors and audio descriptors prior to mapping the visual descriptors and audio descriptors to the descriptor codebook. In one or more embodiments, mapping the visual descriptors and the audio descriptors to the descriptor codebook comprises mapping the visual descriptors to visual descriptor codebook and mapping the audio descriptors to audio descriptor codebook.

In some embodiments, act 1030 involves generating unified audio-visual embedding from corresponding visual and audio descriptors utilizing a fully connected neural network layer. Additionally, act 1030 involves mapping the visual descriptors and audio descriptors to a descriptor codebook by mapping unified audio-visual embeddings to the descriptor codebook.

In still further embodiments, act 1030 involves determining a segment relevance score between a video segment of the known video and a codeword mapped to a segment of the query video. In particular, act 1030 involves determining a codeword frequency indicating a number of times the codeword appears in the video segment of the known video and determining an inverse video frequency that measures how common the codeword is across all video segments in the inverse index.

Optionally, act 1030 also involves determining a video relevance score by summing segment relevance scores between the video segments of the known video and the mapped descriptor codebook(s). In such embodiments, act 1030 further involves ranking a subset of known videos from the plurality of known videos corresponding to the determined video segments based on video relevance scores.

FIG. 10 further shows that the series of acts 1000 include an act 1040 of identifying a known video of the plurality of known videos that corresponds to the query video from the determined video segments. For example, act 1040, in one or more embodiments, involves comprises performing edit distance re-ranking of the subset of known videos.

In addition to the foregoing, the series of acts 1000 involves, in one or more embodiments, generating one or more visual indicators identifying locations of editorial modifications in the query video relative to the known video.

Still further the series of acts 1000 optionally involves generating a heatmap bar localizing the query video within the known video.

FIG. 11 illustrates an examples series of acts 1100 for generating an inverse index for identifying known video corresponding to query videos. As shown, the series of acts 1100 includes an act 1110 of sub-dividing known videos into visual segments and audio segments. In particular, the act 1010 involves sub-dividing the known videos into equal-length segments.

The series of acts 1100 also includes an act 1120 of generating visual descriptors for the visual segments utilizing a visual neural network encoder. Additionally, the series of acts 1100 includes an act 1130 of generating audio descriptors for the audio segments utilizing an audio neural network encoder. For instance, the acts 1120 and 1130 include generating visual descriptors and audio descriptors that are robust to benign visual and audio perturbations. In particular, the series of acts 1100 includes learning parameters of the visual neural network encoder utilizing video frames with frame-level augmentations including one or more of random noise, blur, horizonal flip, pixelation, rotation, text overlay, emoji overlay, padding, or color jitter. Still further, the series of acts 1100 includes learning parameters of the audio neural network encoder utilizing audio segments with augmentations including one or more of audio lengthening, audio shortening, addition of audio components, removal of audio components, or alteration of audio components. Furthermore, series of acts 1100 includes learning parameters of the visual neural network encoder and the audio neural network encoder utilizing a contrastive loss.

The series of acts 1100 also includes an act 1140 of generating one or more descriptor codebooks from the audio descriptors and the visual descriptors. For example, in one or more embodiments, act 1140 involves fusing corresponding audio and video descriptors to generate fused descriptors. In such embodiments, act 1140 involves clustering the fused descriptors utilizing a clustering algorithm. For example, act 1140 can involve utilizing k-means to cluster the fused descriptors into k codewords of a codebook.

Alternatively, act 1140 involves generating unified audio-visual embeddings from corresponding visual and audio descriptors utilizing a fully connected neural network layer. In such embodiments, act 1140 involves clustering the unified audio-visual embeddings utilizing a clustering algorithm. For example, act 1140 can involve utilizing k-means to cluster the unified audio-visual embeddings into k codeworks of a codebook.

In additional embodiments, act 1140 involves clustering the visual descriptors utilizing a clustering algorithm. For example, act 1140 can involve utilizing k-means to cluster the visual descriptors into k visual codewords of a visual codebook. Similarly, act 1140 involves clustering the audio descriptors utilizing a clustering algorithm. For example, act 1140 can involve utilizing k-means to cluster the audio descriptors into k audio codewords of an audio codebook.

The series of acts 1100 also includes an act 1150 of generating an inverse index for identifying known videos corresponding to query videos by mapping video segments from the known videos to the descriptor codebook(s). For example, in one or more embodiments, act 1150 involves building a dictionary from the k codewords. Act 1150 further involves breaking known videos into segments, which each segment is represented as a bag of codewords. The k codewords are used as entries into the inverse index, listing all the segments into the database. Act 1150 further involves generating a mapping between each segment and known video identifier.

The components of the video comparison system 102 can include software, hardware, or both. For example, the components of the video comparison system 102 can include one or more instructions stored on a computer-readable storage medium and executable by processors (or at least one processor) of one or more computing devices (e.g., the computing device 1200). When executed by the one or more processors, the computer-executable instructions of the video comparison system 102 can cause the computing device 1200 to perform the methods described herein. Alternatively, the components of the video comparison system 102 can comprise hardware, such as a special purpose processing device to perform a certain function or group of functions. Additionally, or alternatively, the components of the video comparison system 102 can include a combination of computer-executable instructions and hardware.

Furthermore, the components of the video comparison system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the video comparison system 102 may be implemented as part of a stand-alone application on a personal computing device or a mobile device. Alternatively, or additionally, the components of the video comparison system 102 may be implemented in any application for displaying, modifying, or identifying digital content, including, but not limited to ADOBE CREATIVE CLOUD, LIGHTROOM, BEHANCE, PHOTOSHOP, and ADOBE STOCK. The foregoing are either registered trademarks or trademarks of Adobe Inc. in the United States and/or other countries.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
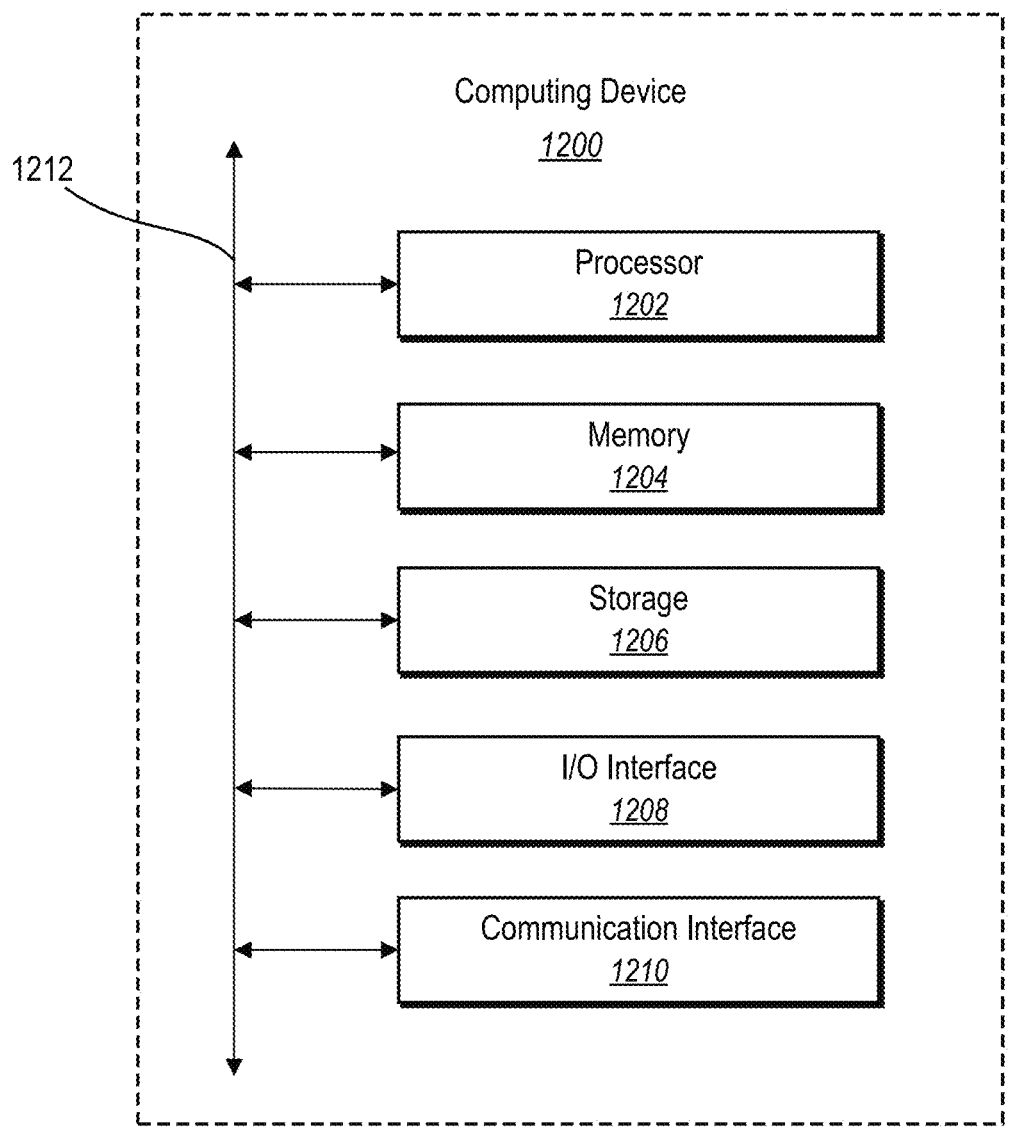
FIG. 12 illustrates a block diagram of an example computing device in accordance with one or more embodiments.

FIG. 12 illustrates, in block diagram form, an example computing device 1200 (e.g., the client device 122 and/or the server(s) 104) that may be configured to perform one or more of the processes described above. One will appreciate that the video comparison system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause the at least one processor to perform operations comprising:
    sub-dividing a query video into visual segments and audio segments;
    generating visual descriptors for the visual segments of the query video utilizing a visual neural network encoder;
    generating audio descriptors for the audio segments of the query video utilizing an audio neural network encoder;
    determining video segments from a plurality of known videos that are similar to the query video based on the visual descriptors and audio descriptors utilizing an inverse index by:
        mapping the visual descriptors and the audio descriptors to codewords; and
        identifying the video segments from the plurality of known videos based on the mapped codewords; and
    identifying a known video of the plurality of known videos that corresponds to the query video from the determined video segments.

2. The non-transitory computer readable medium of claim 1, wherein the operations further comprise generating one or more visual indicators identifying locations of editorial modifications in the query video relative to the known video.

3. The non-transitory computer readable medium of claim 1, wherein sub-dividing the query video into visual segments and audio segments comprises subdividing the query video into equal-length segments.

4. The non-transitory computer readable medium of claim 1, wherein determining video segments from the plurality of known videos that are similar to the query video based on the visual descriptors and the audio descriptors utilizing an inverse index comprises:
    identifying one or more known videos that include the codewords, and ranking the one or more known videos.

5. The non-transitory computer readable medium of claim 1, wherein the operations further comprise fusing the visual descriptors and audio descriptors prior to mapping the visual descriptors and audio descriptors to the codewords.

6. The non-transitory computer readable medium of claim 1, wherein mapping the visual descriptors and the audio descriptors to the codewords comprises:
    mapping the visual descriptors to visual codewords; and
    mapping the audio descriptors to audio codewords.

7. The non-transitory computer readable medium of claim 1, wherein:
    the operations further comprise generating unified audio-visual embeddings from corresponding visual and audio descriptors utilizing a fully connected neural network layer; and
    mapping the visual descriptors and audio descriptors to the codewords comprises mapping unified audio-visual embeddings to a codebook.

8. The non-transitory computer readable medium of claim 1, wherein determining video segments from a plurality of known videos that are similar to the query video based on the visual descriptors and audio descriptors comprises determining a segment relevance score between a video segment of the known video and a codeword mapped to a segment of the query video by:
    determining a codeword frequency indicating a number of times the codeword appears in the video segment of the known video; and
    determining an inverse video frequency that measures how common the codeword is across all video segments in the inverse index.

9. The non-transitory computer readable medium of claim 8, wherein the operations further comprise:
    determining a video relevance score by summing segment relevance scores between the video segments of the known video and the mapped codewords; and ranking a subset of known videos from the plurality of known videos corresponding to the determined video segments based on video relevance scores.

10. The non-transitory computer readable medium of claim 9, wherein identifying the known video of the plurality of known videos that corresponds to the query video from the determined video segments comprises performing edit distance re-ranking of the subset of known videos.

11. The non-transitory computer readable medium of claim 1, wherein generating visual descriptors for the visual segments of the query video utilizing the visual neural network encoder comprises generating a visual segment embedding for a combination of frames of a visual segment of the query video utilizing the visual neural network encoder.

12. The non-transitory computer readable medium of claim 1, wherein generating visual descriptors for the visual segments of the query video utilizing the visual neural network encoder comprises:
generating frame embeddings for each frame of a visual segment of the query video utilizing the visual neural network encoder; and
averaging the frame embeddings for the visual segment to generate a visual descriptor for the visual segment.

13. A system comprising:
one or more memory devices comprising a set of known digital videos; and
one or more processors that are configured to cause the system to:
sub-divide known videos into visual segments and audio segments;
generate visual descriptors for the visual segments utilizing a visual neural network encoder;
generate audio descriptors for the audio segments utilizing an audio neural network encoder;
generate codewords from the audio descriptors and the visual descriptors;
generate an inverse index for identifying known videos corresponding to query videos by mapping video segments from the known videos to the codewords;
map query video visual descriptors and query video audio descriptors from a query video to the codewords;
determine one or more video segments from the known videos that correspond to the query video based on the codewords; and
identify a known video of the set of known digital videos that corresponds to the query video from the determined one or more video segments.

14. The system of claim 13, wherein the one or more processors are further configured to cause the system to generate visual descriptors and audio descriptors that are robust to benign visual and audio perturbations.

15. The system of claim 14, wherein the one or more processors are further configured to cause the system to learn parameters of the visual neural network encoder utilizing video frames with frame-level augmentations including one or more of random noise, blur, horizonal flip, pixelation, rotation, text overlay, emoji overlay, padding, or color jitter.

16. The system of claim 14, wherein the one or more processors are further configured to cause the system to learn parameters of the audio neural network encoder utilizing audio segments with augmentations including one or more of audio lengthening, audio shortening, addition of audio components, removal of audio components, or alteration of audio components.

17. The system of claim 13, wherein the one or more processors are further configured to cause the system to learn parameters of the visual neural network encoder and the audio neural network encoder utilizing a contrastive loss.

18. A computer-implemented method comprising:
sub-dividing a query video into visual segments and audio segments;
generating visual descriptors for the visual segments of the query video utilizing a visual neural network encoder that is robust to benign visual perturbations;
generating audio descriptors for the audio segments of the query video utilizing an audio neural network encoder that is robust to benign audio perturbations;
determining video segments from a plurality of known videos that are similar to the query video based on the visual descriptors and audio descriptors utilizing an inverse index by:
mapping the visual descriptors and the audio descriptors to codewords; and
identifying the video segments from the plurality of known videos based on the mapped codewords; and
identifying a known video of the plurality of known videos that corresponds to the query video from the determined video segments.

19. The computer-implemented method of claim 18, further comprising generating one or more visual indicators identifying an editorial visual change in the query video relative to the known video.

20. The computer-implemented method of claim 18, further comprising generating a heatmap bar localizing the query video within the known video.

* * * * *